United States Patent
Raman et al.

(10) Patent No.: US 11,784,789 B2
(45) Date of Patent: Oct. 10, 2023

(54) DISTRIBUTED PLATFORM FOR COMPUTATION AND TRUSTED VALIDATION

(71) Applicant: International Business Machines Corporation, Armonk, NY (US)

(72) Inventors: Ravi Kiran Raman, Champain, IL (US); Kush R. Varshney, Yorktown Heights, NY (US); Roman Vaculin, Larchmont, NY (US); Michael Hind, Yorktown Heights, NY (US); Sekou L. Remy, Nairobi (KE); Eleftheria K. Pissadaki, Yorktown Heights, NY (US); Nelson K. Bore, Nairobi (KE)

(73) Assignee: International Business Machines Corporation, Armonk, NY (US)

( * ) Notice: Subject to any disclaimer, the term of this patent is extended or adjusted under 35 U.S.C. 154(b) by 245 days.

(21) Appl. No.: 17/246,488

(22) Filed: Apr. 30, 2021

(65) Prior Publication Data
US 2021/0273781 A1    Sep. 2, 2021

Related U.S. Application Data

(62) Division of application No. 16/135,260, filed on Sep. 19, 2018, now Pat. No. 11,032,063.

(51) Int. Cl.
*H04L 29/06* (2006.01)
*H04L 9/06* (2006.01)
(Continued)

(52) U.S. Cl.
CPC ............ *H04L 9/0637* (2013.01); *G06F 21/57* (2013.01); *G06F 30/20* (2020.01); *H04L 9/0643* (2013.01);
(Continued)

(58) Field of Classification Search
CPC ............... H04L 9/0637; H04L 9/0643; H04L 9/3236; H04L 41/145; H04L 63/12; H04L 67/104; H04L 9/50; G06F 30/20; G06F 21/57
See application file for complete search history.

(56) References Cited

U.S. PATENT DOCUMENTS

| | | |
|---|---|---|
| 7,512,117 B2 | 3/2009 | Swartz |
| 8,380,855 B2 | 2/2013 | Bryce et al. |

(Continued)

FOREIGN PATENT DOCUMENTS

| | | |
|---|---|---|
| JP | H10105054 A | 4/1998 |
| JP | 2001202391 A | 7/2001 |

(Continued)

OTHER PUBLICATIONS

Notice of Reasons for Refusal issued in the related JP Application No. 2021-512757, drafted on Jan. 25, 2023.
(Continued)

*Primary Examiner* — Malcolm Cribbs

(57) ABSTRACT

An example operation may include one or more of obtaining data of a simulation, identifying checkpoints within the simulation data, generating a plurality of sequential data structures based on the identified checkpoints, where each data structure identifies an evolving state of the simulation with respect to a previous data structure among the sequential data structures, and transmitting the generated sequential data structures to nodes of a blockchain network for inclusion in one or more data blocks within a hash-linked chain of data blocks.

17 Claims, 20 Drawing Sheets

(51) Int. Cl.
*G06F 30/20* (2020.01)
*G06F 21/57* (2013.01)
*H04L 9/32* (2006.01)
*H04L 41/14* (2022.01)
*H04L 9/40* (2022.01)
*H04L 67/104* (2022.01)
*H04L 9/00* (2022.01)

(52) U.S. Cl.
CPC .......... *H04L 9/3236* (2013.01); *H04L 41/145* (2013.01); *H04L 63/12* (2013.01); *H04L 67/104* (2013.01); *H04L 9/50* (2022.05)

(56) References Cited

U.S. PATENT DOCUMENTS

| | | | |
|---|---|---|---|
| 8,429,412 | B2 | 4/2013 | Bleckmann et al. |
| 8,914,734 | B2 | 12/2014 | Narayanaswamy |
| 8,929,522 | B2 | 1/2015 | Berk |
| 9,069,778 | B1 | 6/2015 | Bent et al. |
| 9,098,832 | B1 | 8/2015 | Scardino |
| 10,114,969 | B1 | 10/2018 | Chaney et al. |
| 10,262,127 | B2 | 4/2019 | Subramaniyan et al. |
| 10,304,062 | B1 | 5/2019 | Hines |
| 10,365,922 | B1 | 7/2019 | Wang et al. |
| 10,445,643 | B2 | 10/2019 | Katz et al. |
| 10,496,923 | B2 | 12/2019 | Katz et al. |
| 10,503,427 | B2 | 12/2019 | Botes et al. |
| 10,554,394 | B1 | 2/2020 | Krut |
| 10,853,146 | B1 | 12/2020 | Talayco |
| 10,873,457 | B1 | 12/2020 | Beaudoin et al. |
| 10,938,567 | B2 | 3/2021 | Martino et al. |
| 11,146,380 | B2 | 10/2021 | Wood et al. |
| 11,188,977 | B2 | 11/2021 | Youb et al. |
| 2003/0028413 | A1 | 2/2003 | White et al. |
| 2003/0053444 | A1 | 3/2003 | Swartz |
| 2003/0093252 | A1 | 5/2003 | Frankel et al. |
| 2007/0047556 | A1 | 3/2007 | Raahemi et al. |
| 2009/0046569 | A1 | 2/2009 | Chen et al. |
| 2009/0049514 | A1 | 2/2009 | Yan et al. |
| 2009/0119310 | A1 | 5/2009 | Larue, Jr. et al. |
| 2010/0250756 | A1 | 9/2010 | Morris |
| 2011/0154204 | A1 | 6/2011 | Narayanaswamy |
| 2012/0011401 | A1 | 1/2012 | Ranganathan et al. |
| 2012/0272133 | A1 | 10/2012 | Carroll et al. |
| 2012/0275349 | A1 | 11/2012 | Boyer et al. |
| 2014/0129529 | A1 | 5/2014 | Akelbein et al. |
| 2014/0142860 | A1 | 5/2014 | Lu |
| 2014/0226537 | A1 | 8/2014 | Kashimba et al. |
| 2014/0281743 | A1 | 9/2014 | Hayder et al. |
| 2014/0337316 | A1 | 11/2014 | Abuelsaad et al. |
| 2015/0100501 | A1 | 4/2015 | Young |
| 2016/0299834 | A1 | 10/2016 | Tomizawa |
| 2016/0316204 | A1 | 10/2016 | Wee et al. |
| 2017/0103167 | A1 | 4/2017 | Shah |
| 2017/0111457 | A1 | 4/2017 | Rivera |
| 2017/0132625 | A1 | 5/2017 | Kennedy |
| 2017/0214701 | A1 | 7/2017 | Hasan |
| 2017/0244757 | A1 | 8/2017 | Castinado et al. |
| 2017/0353309 | A1 | 12/2017 | Gray |
| 2017/0353311 | A1 | 12/2017 | Schukai et al. |
| 2018/0082043 | A1* | 3/2018 | Witchey ................. G16H 10/60 |
| 2018/0082256 | A1 | 3/2018 | Tummuru et al. |
| 2018/0088928 | A1 | 3/2018 | Smith et al. |
| 2018/0101701 | A1 | 4/2018 | Barinov et al. |
| 2018/0115428 | A1 | 4/2018 | Lysenko et al. |
| 2018/0139042 | A1 | 5/2018 | Binning et al. |
| 2018/0150799 | A1 | 5/2018 | Hunt et al. |
| 2018/0152297 | A1 | 5/2018 | Fielding et al. |
| 2018/0157825 | A1 | 6/2018 | Eksten et al. |
| 2018/0176578 | A1 | 6/2018 | Rippel et al. |
| 2018/0189449 | A1 | 7/2018 | Karumba et al. |
| 2018/0189732 | A1 | 7/2018 | Kozloski et al. |
| 2018/0205552 | A1 | 7/2018 | Struttmann et al. |
| 2018/0225424 | A1 | 8/2018 | Kaditz et al. |
| 2018/0227116 | A1 | 8/2018 | Chapman et al. |
| 2018/0253464 | A1 | 9/2018 | Kohli et al. |
| 2018/0293366 | A1 | 10/2018 | Subramaniyan et al. |
| 2019/0014884 | A1 | 1/2019 | Fu et al. |
| 2019/0018916 | A1 | 1/2019 | Benedikt et al. |
| 2019/0033382 | A1 | 1/2019 | Karner et al. |
| 2019/0080483 | A1 | 3/2019 | Mammou et al. |
| 2019/0081918 | A1 | 3/2019 | Kamrani |
| 2019/0087558 | A1 | 3/2019 | Mercury et al. |
| 2019/0089701 | A1 | 3/2019 | Mercury et al. |
| 2019/0098467 | A1 | 3/2019 | Fonk et al. |
| 2019/0207751 | A1 | 7/2019 | Harvey |
| 2019/0251295 | A1* | 8/2019 | Vieyra ..................... H04L 9/30 |
| 2019/0251523 | A1 | 8/2019 | Rittman et al. |
| 2019/0303942 | A1 | 10/2019 | Balaraman et al. |
| 2019/0334700 | A1 | 10/2019 | Callan et al. |
| 2019/0347658 | A1* | 11/2019 | Haimes ................. G06Q 20/04 |
| 2019/0349426 | A1 | 11/2019 | Smith et al. |
| 2019/0377811 | A1 | 12/2019 | Aleksander et al. |
| 2019/0379543 | A1 | 12/2019 | Sethi et al. |
| 2019/0391869 | A1 | 12/2019 | Gopal et al. |
| 2020/0019865 | A1 | 1/2020 | Wang et al. |
| 2020/0042656 | A1* | 2/2020 | Zapolsky ............... G06V 20/10 |
| 2020/0043007 | A1 | 2/2020 | Simons |
| 2020/0075056 | A1 | 3/2020 | Yang et al. |
| 2020/0085330 | A1 | 3/2020 | Poian et al. |
| 2020/0167654 | A1 | 5/2020 | Guo et al. |

FOREIGN PATENT DOCUMENTS

| | | |
|---|---|---|
| JP | 2008282308 A | 11/2008 |
| WO | 2017066431 A1 | 4/2017 |
| WO | 2017136643 A1 | 8/2017 |
| WO | 2017145006 A1 | 8/2017 |
| WO | 2018020944 A1 | 2/2018 |
| WO | 2018031551 A1 | 2/2018 |

OTHER PUBLICATIONS

List of IBM Patents or Patent Applications treated as related, Jun. 1, 2021.
Ravi Kiran Raman et al., Distributed Platform for Computation and Trusted Validation, U.S. Appl. No. 16/135,260, filed Sep. 19, 2018.
Ravi Kiran Raman et al., Distributed Platform for Computation and Trusted Validation, U.S. Appl. No. 16/135,438, filed Sep. 19, 2018.
Ravi Kiran Raman et al., Distributed Platform for Computation and Trusted Validation, U.S. Appl. No. 16/135,326, filed Sep. 19, 2018.
International Search Report and Written Opinion issued in the corresponding International Application No. PCT/EP2019/073066, dated Nov. 4, 2019.
Partial Search Report issued in the corresponding International Application No. PCT/EP2019/073066, dated Oct. 1, 2019.

* cited by examiner

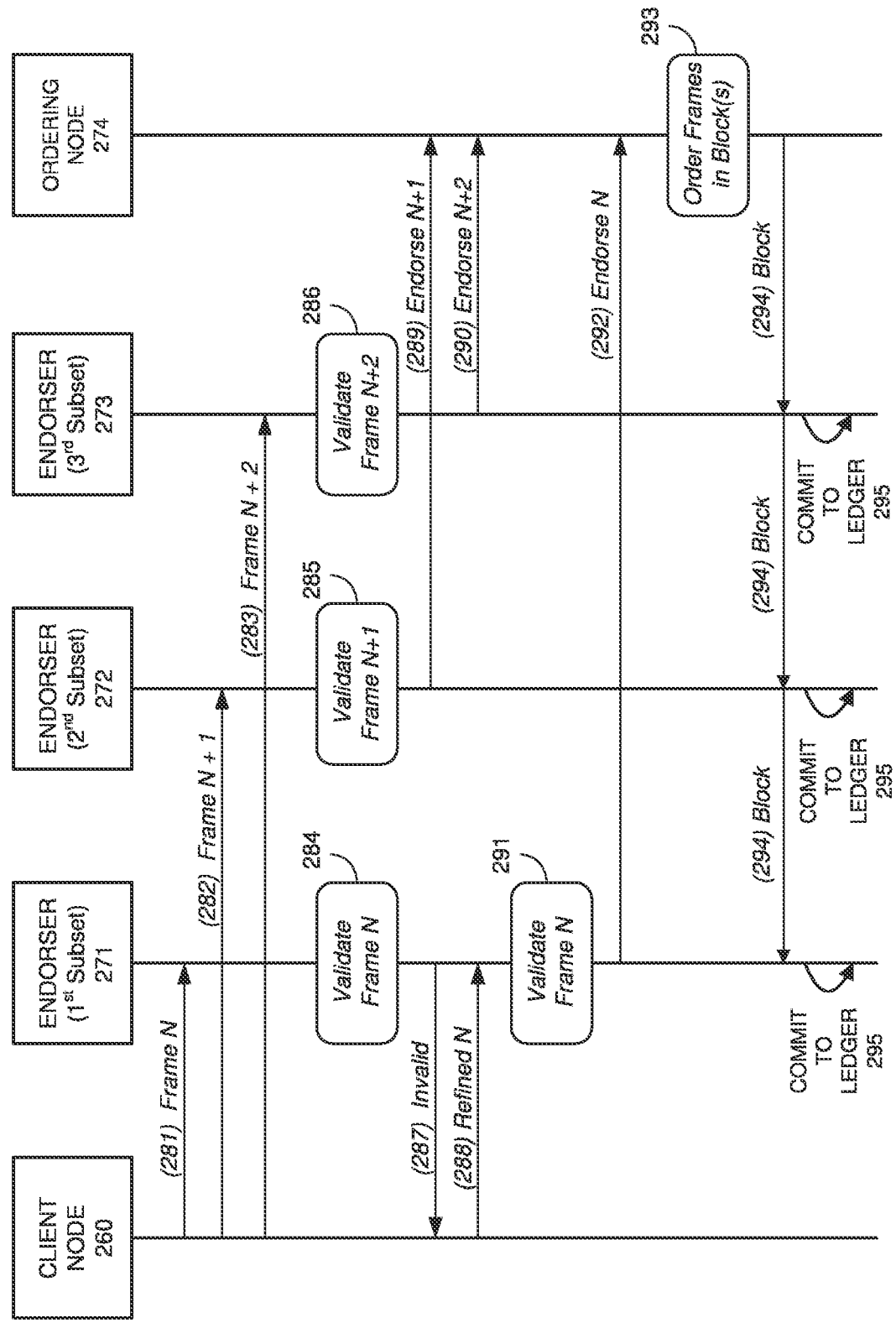

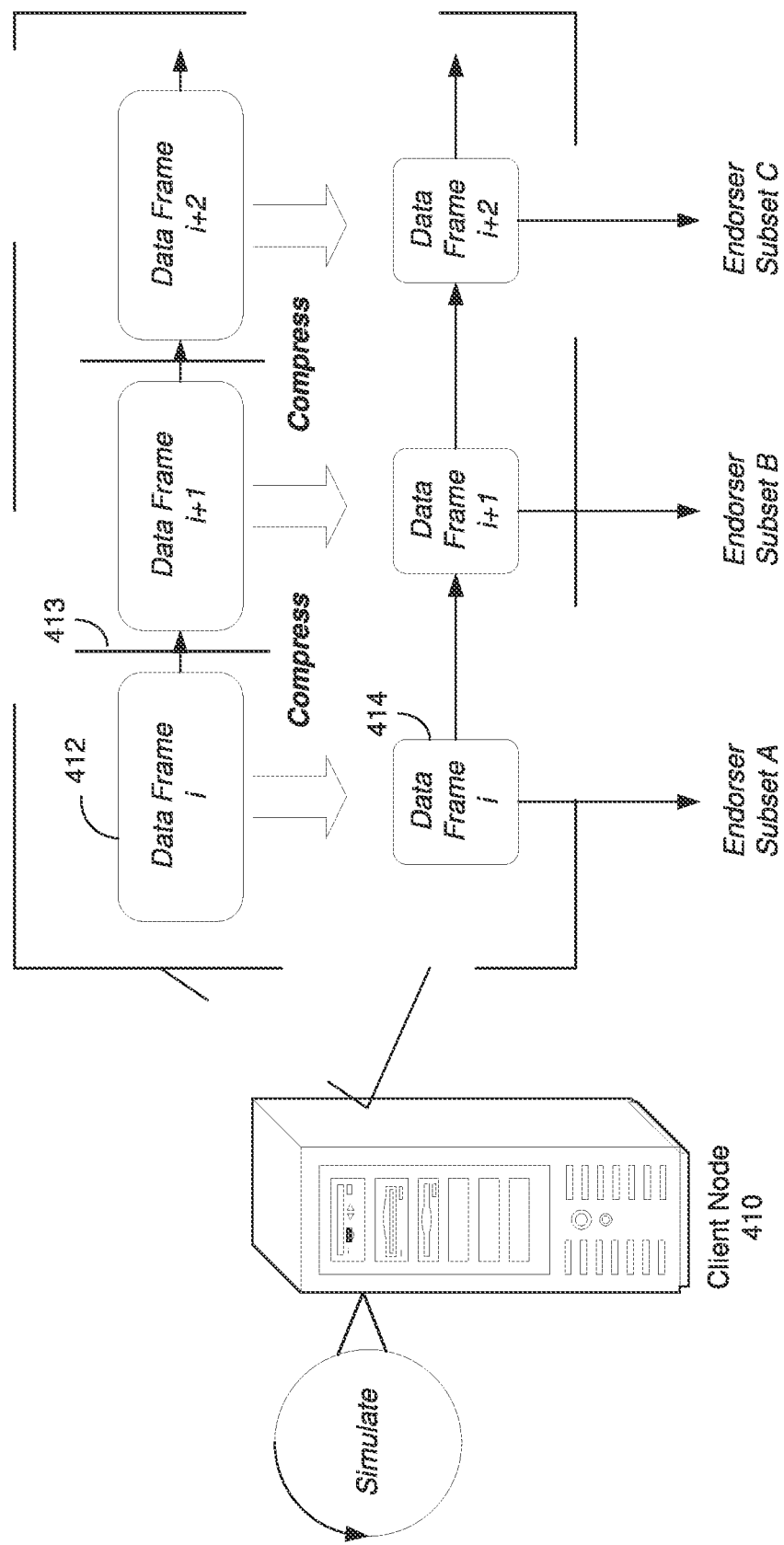

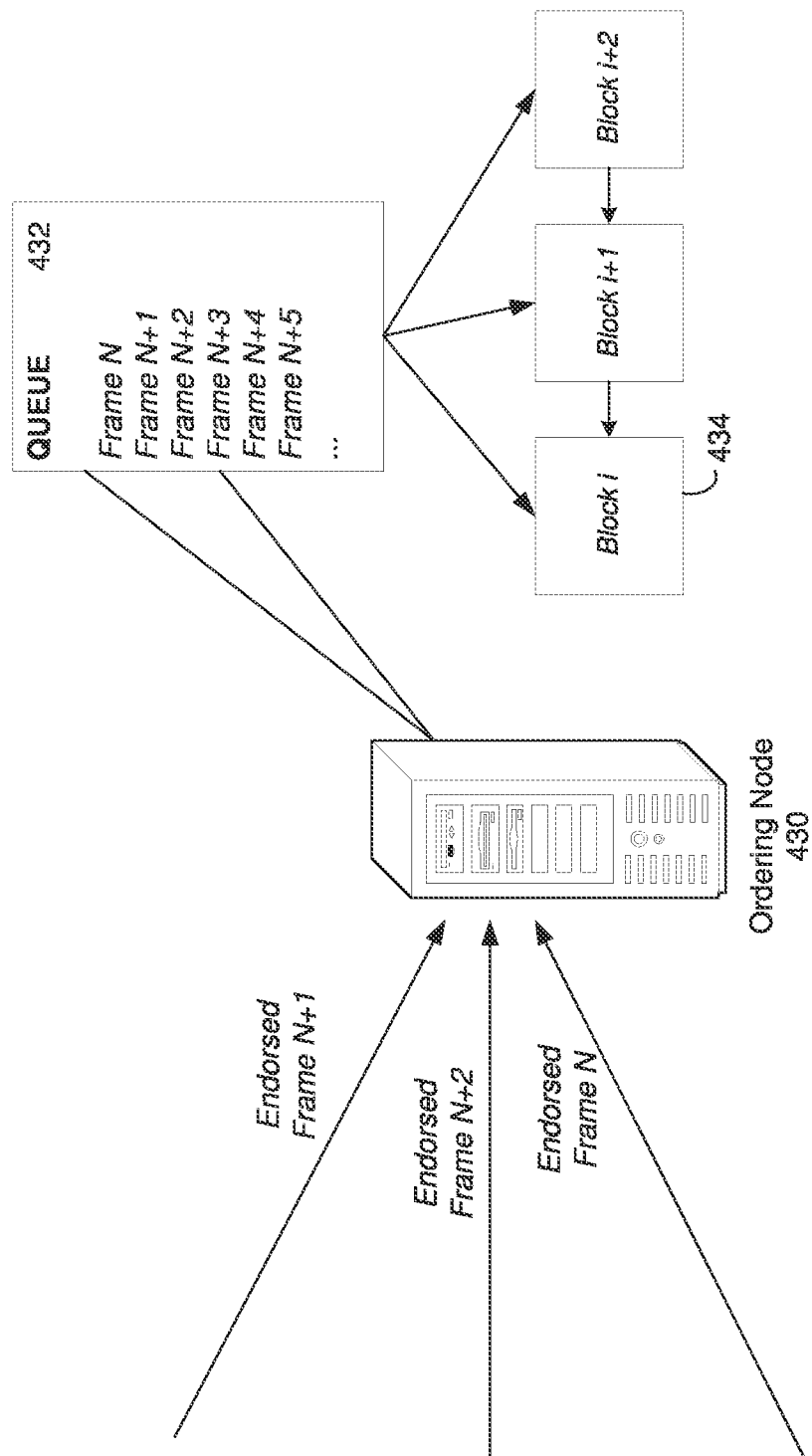

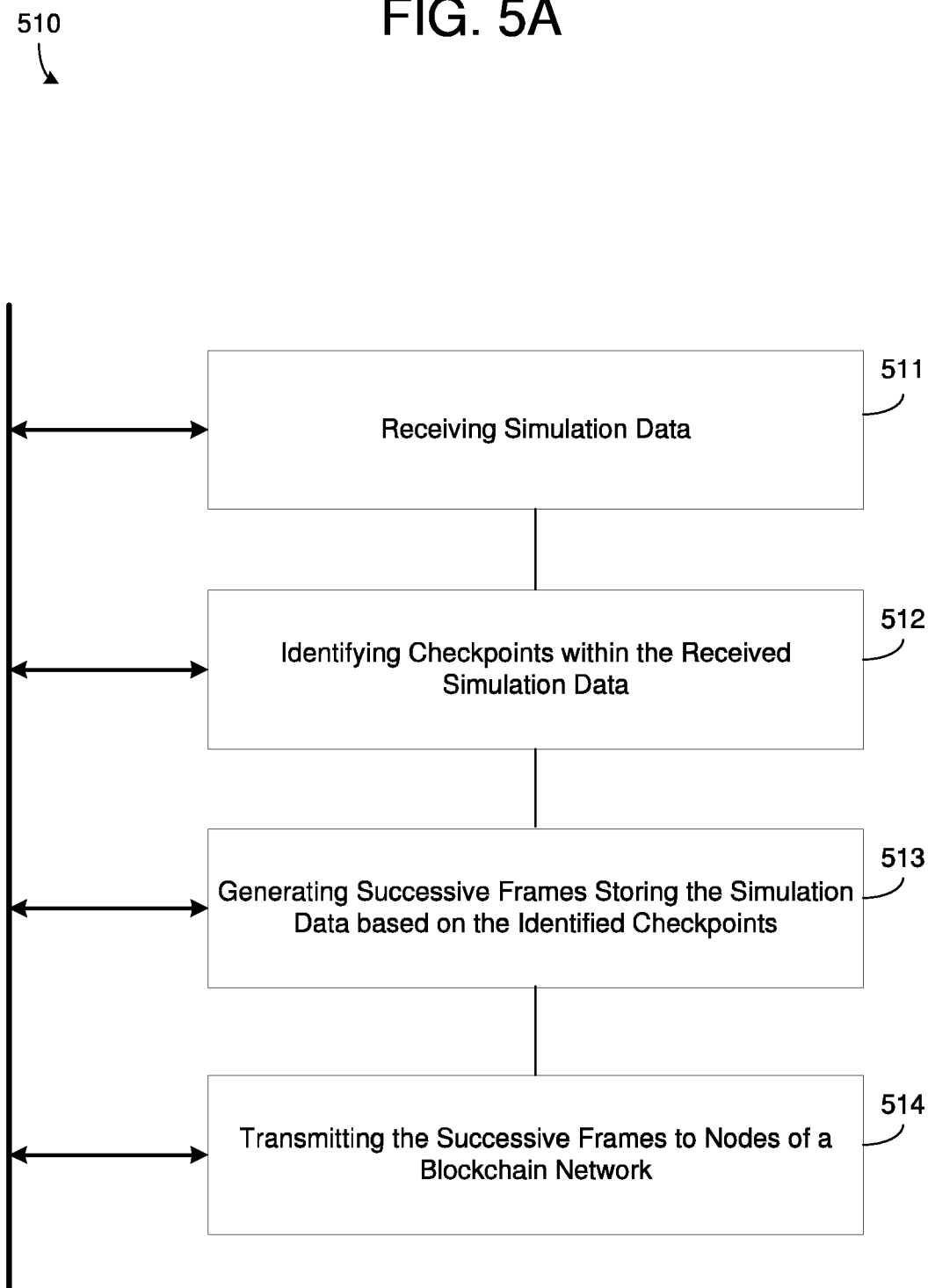

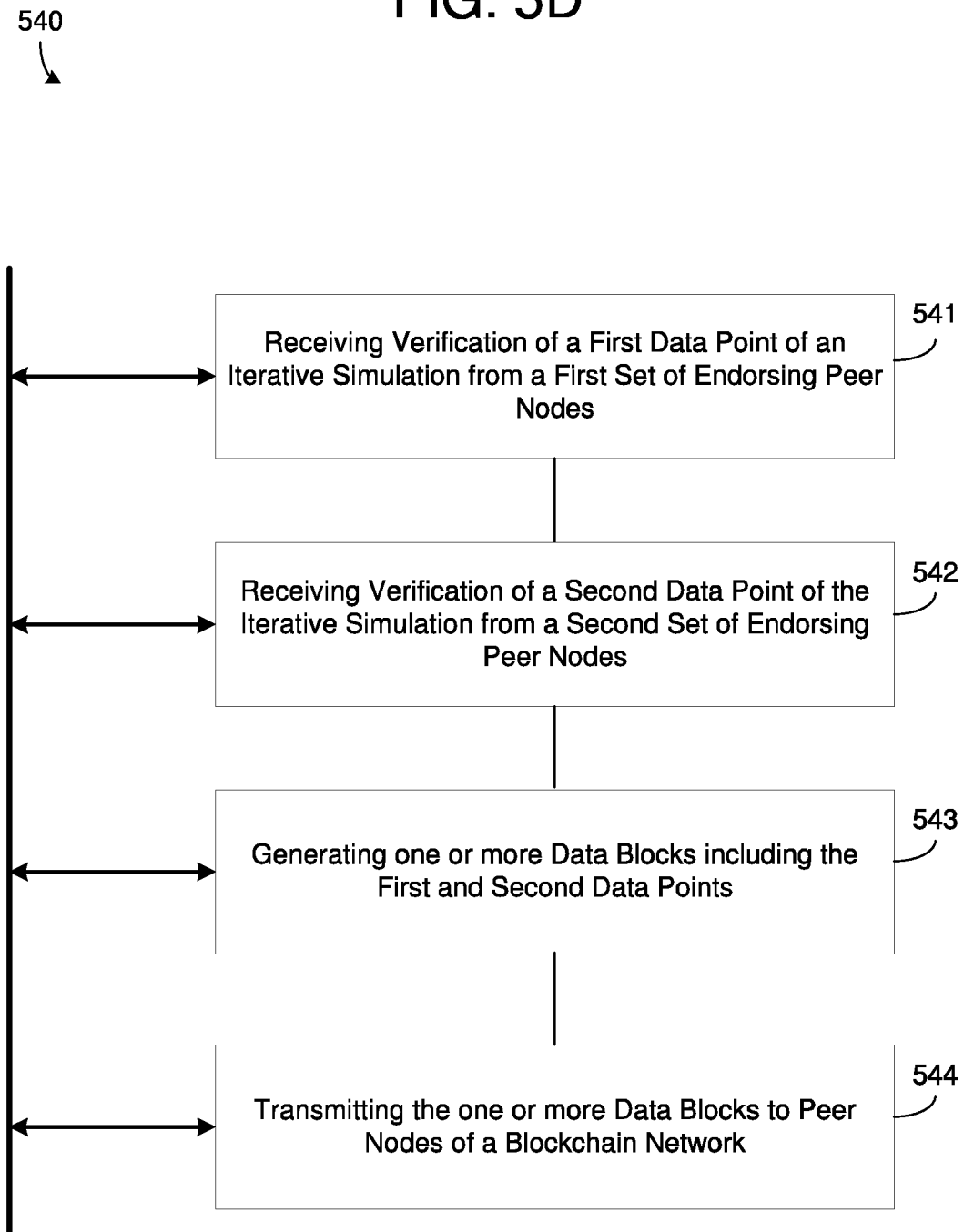

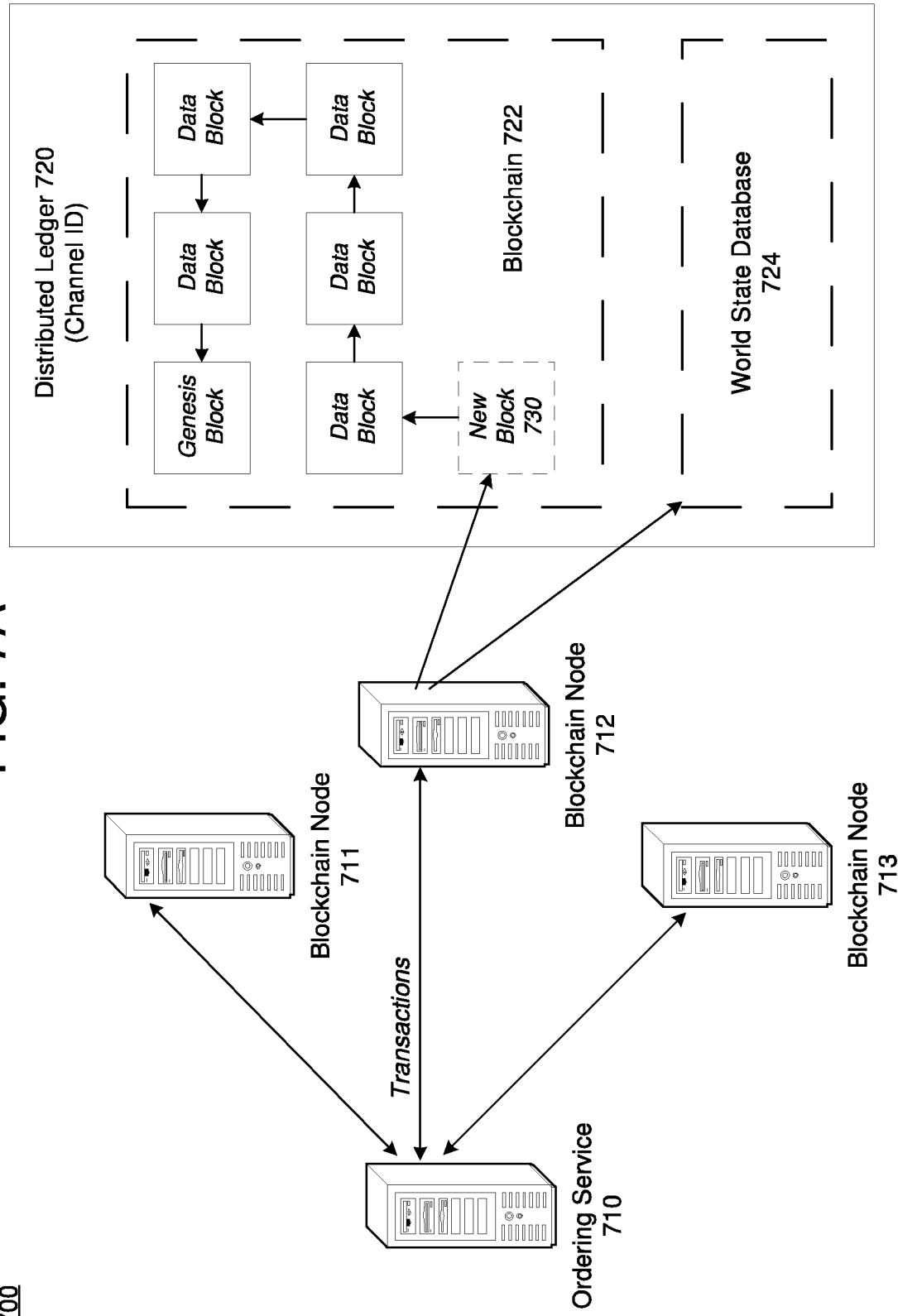

DISTRIBUTED PLATFORM FOR COMPUTATION AND TRUSTED VALIDATION

TECHNICAL FIELD

This application generally relates to a simulation and learning system, and more particularly, to a decentralized database such as a blockchain in which an evolving computation state is stored on a blockchain where multiple nodes share in a trusted validation and verification of the computation.

BACKGROUND

A centralized database stores and maintains data in one single database (e.g., database server) at one location. This location is often a central computer, for example, a desktop central processing unit (CPU), a server CPU, or a mainframe computer. Information stored on a centralized database is typically accessible from multiple different points. Multiple users or client workstations can work simultaneously on the centralized database, for example, based on a client/server configuration. Because of its single location, a centralized database is easy to manage, maintain, and control, especially for purposes of security. Within a centralized database data integrity is maximized and data redundancy is minimized as a single storing place of all data also implies that a given set of data only has one primary record. This aids in maintaining data as accurate and as consistently as possible and enhances data reliability.

However, a centralized database suffers from significant drawbacks. For example, a centralized database has a single point of failure. In particular, if there is no fault-tolerance setup and a hardware failure occurs, all data within the database is lost and work of all users is interrupted. In addition, a centralized database is highly dependent on network connectivity. As a result, the slower the Internet connection, the longer the amount of time needed for each database access. Another drawback is that bottlenecks occur when the centralized database experiences high traffic due to the single location. Furthermore, a centralized database provides limited access to data because only one copy of the data is maintained by the database. As a result, multiple users may not be able to access the same piece of data at the same time without creating problems such as overwriting stored data. Furthermore, because a central database system has minimal to no data redundancy, if a set of data is unexpectedly lost it is difficult to retrieve it other than through manual operation from back-up disk storage.

A decentralized database such as a blockchain system provides a storage system capable of addressing the drawbacks of a centralized database. In a blockchain system, multiple peer nodes store a distributed ledger. Clients interact with peer nodes to gain access to the blockchain. The peer nodes may be controlled by different entities having different interests and therefore are not trusting entities with respect to one another. Furthermore, there is no central authority in a blockchain. Therefore, in order for data to be added to or changed on the distributed ledger in a trusted manner, a consensus of peer nodes must occur. The consensus provides a way for trust to be achieved in a blockchain system of untrusting peer nodes.

Meanwhile, computation and learning systems are increasingly being deployed in a variety of environments to understand, infer, and most importantly, make decisions at a policy-based scale for scenarios with large-scale implications. For instance, a simulation environment may be used to understand a propagation of a disease, and the effects of various control mechanisms in varying geographical and demographic contexts. Similarly, deep learning may be used to learn underlying states of systems and are increasingly deployed in day-to-day applications such as self-driving cars, analytics, supply chain, and many others.

As another example, computations associated with fields such as epidemiology and meteorology may take weeks of running time. For example, malaria data scientist (MDS) may run experiments to simulate disease spread using two or more computational model agents (e.g., OpenMalaria and Epidemiological Modeling software (EMOD)). The model runs many distinct simulations to compare effects of changes in model structure or parameters. The goal of the experiments is to come up with validated policies and intervention strategies to eradicate diseases.

These large-simulation based systems often require inputs and outputs to be shared among multiple disparate parties for timely decision making in a low-resource, and social good context. However, much of these computations and inferences (e.g., training of a deep neural networks etc.) are made locally by individual, and often independent agents, resulting in a system of untrusted interacting systems. Considering the scale of impact that such systems have, it is important that the results inferred by individual agents are trustworthy and transferable. Furthermore, endorsers can be erroneous, adversarial, or slow to compute. Therefore, validation can be expensive in terms of time to endorse each frame. For example, if an endorser is a straggler, then obtaining endorsement can be unduly delayed. Therefore, it is essential that entities in the system can trust the validity of the conclusions obtained by individual agents and that such validity is performed efficiently, to use them for further study and development as a group. Transparency also guarantees provenance in such systems wherein it is important to be able to identify the source of errors.

SUMMARY

One example embodiment may provide a computing system that includes one or more of a processor configured to one or more of receive data of a simulation, identify checkpoints within the simulation data, and generate a plurality of sequential data structures based on the identified checkpoints, where each data structure identifies of an evolution of a state of the simulation with respect to a previous data structure among the sequential data structures, and a network interface configured to transmit the sequential data structures to nodes of a blockchain network for inclusion in one or more data blocks within a hash-linked chain of data blocks.

Another example embodiment may provide a method that includes one or more of obtaining data of a simulation, identifying checkpoints within the simulation data, generating a plurality of sequential data structures based on the identified checkpoints, where each data structure identifies an evolving state of the simulation with respect to a previous data structure among the sequential data structures, and transmitting the generated sequential data structures to nodes of a blockchain network for inclusion in one or more data blocks within a hash-linked chain of data blocks.

A further example embodiment may provide a non-transitory computer readable medium comprising instructions, that when read by a processor, cause the processor to perform one or more of obtaining data of a simulation, identifying checkpoints within the simulation data, generating a plurality of sequential data structures based on the identified checkpoints, where each data structure identifies an evolving state of the simulation with respect to a previous data structure among the sequential data structures, and transmitting the generated sequential data structures to nodes of a blockchain network for inclusion in one or more data blocks within a hash-linked chain of data blocks.

Another example embodiment may provide a computing system that includes one or more of a network interface configured to receive a data structure from among sequential data structures of an iterative simulation that store state data of the iterative simulation, and a processor configured to one or more of generate a local computation of state data for the data structure based on previously validated state data from a previous data structure, and determine a similarity between the local computation of state data and the state data within the received data structure, wherein, in response to a determination that the similarity is within a predetermined threshold, the processor may be further configured to control the network interface to transmit an endorsement of the data structure to a blockchain network for inclusion within a data block among a hash-linked chain of data blocks.

Another example embodiment may provide a method that includes one or more of receiving a data structure from among sequential data structures of an iterative simulation, the data structure storing state data of the iterative simulation, generating a local computation of state data for the data structure based on previously validated state data from a previous data structure, determining a similarity between the local computation of state data and the state data within the received data structure, and in response to a determination that the similarity is within a predetermined threshold, transmitting an endorsement of the data structure to a blockchain network for inclusion within a data block among a hash-linked chain of data blocks.

BRIEF DESCRIPTION OF THE DRAWINGS

FIG. 2B is a diagram illustrating a communication sequence between nodes of a blockchain network, according to example embodiments.

FIG. 4A is a diagram illustrating a process of a client node generating frames of simulation data, according to example embodiments.

FIG. 4C is a diagram illustrating a process of an ordering node arranging frames of simulation data in blocks, according to example embodiments.

FIG. 5A is a diagram illustrating a method of generating frames of simulation data for storage on a blockchain, according to example embodiments.

FIG. 5D is a diagram illustrating a method of ordering simulation data as a result of parallel endorsement processing, according to example embodiments.

FIG. 7A is a diagram illustrating a process of a new block being added to a blockchain ledger, according to example embodiments.

DETAILED DESCRIPTION

Figure 1:
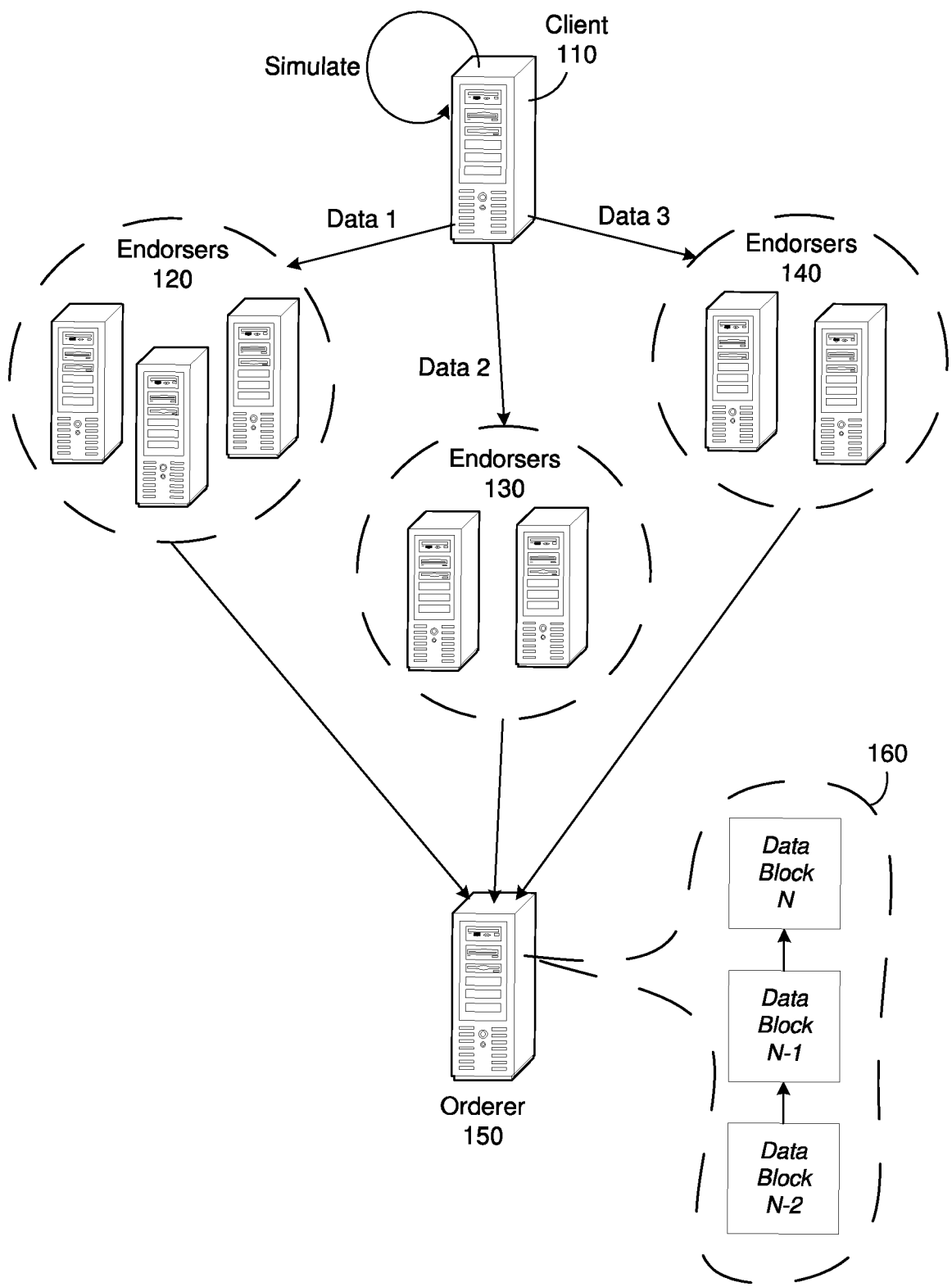
FIG. 1 is a diagram illustrating a blockchain network for validating and storing simulation data, according to example embodiments.

It will be readily understood that the instant components, as generally described and illustrated in the figures herein, may be arranged and designed in a wide variety of different configurations. Thus, the following detailed description of the embodiments of at least one of a method, apparatus, non-transitory computer readable medium and system, as represented in the attached figures, is not intended to limit the scope of the application as claimed but is merely representative of selected embodiments.

The instant features, structures, or characteristics as described throughout this specification may be combined in any suitable manner in one or more embodiments. For example, the usage of the phrases "example embodiments", "some embodiments", or other similar language, throughout this specification refers to the fact that a particular feature, structure, or characteristic described in connection with the embodiment may be included in at least one embodiment. Thus, appearances of the phrases "example embodiments", "in some embodiments", "in other embodiments", or other similar language, throughout this specification do not necessarily all refer to the same group of embodiments, and the described features, structures, or characteristics may be combined in any suitable manner in one or more embodiments.

In addition, while the term "message" may have been used in the description of embodiments, the application may be applied to many types of network data, such as, packet, frame, datagram, etc. The term "message" also includes packet, frame, datagram, and any equivalents thereof. Furthermore, while certain types of messages and signaling may be depicted in exemplary embodiments they are not limited to a certain type of message, and the application is not limited to a certain type of signaling.

Large-scale computational experiments may be used to make policy-level decisions by establishing machine learning models, deep learning systems, predictive analytics, and the like. These computations are often derived from the fusion of individual research and development of multiple independent organizations. However, these organizations are not necessarily trusting of one another. Furthermore, each organization typically maintains its own local version of the model and data which can create shifts in the model between different agencies. The example embodiments provide methods, systems, non-transitory computer readable media, devices, and/or networks, which provide a blockchain network which supports a distributed computation environment that establishes trust among nodes which may be associated with different organizations and entities. The system described herein also establishes provenance such that each entity is able to track source of decisions. The system also provides accountability and transparency which are critical to multi-agent systems such as distributed computing and system of systems contexts. The system ensures validation of the computation by guaranteeing consistent local computations, agreed upon as being correct, and verification of the computation by tracking computation consistency through recorded audits.

A decentralized database is a distributed storage system which includes multiple nodes that communicate with each other. A blockchain is an example of a decentralized database which includes an append-only immutable data structure resembling a distributed ledger capable of maintaining records between mutually untrusted parties. The untrusted parties are referred to herein as peers or peer nodes. Each peer maintains a copy of the database records and no single peer can modify the database records without a consensus being reached among the distributed peers. For example, the peers may execute a consensus protocol to validate blockchain storage transactions, group the storage transactions into blocks, and build a hash chain over the blocks. This process forms the ledger by ordering the storage transactions, as is necessary, for consistency. In a public or permission-less blockchain, anyone can participate without a specific identity. Public blockchains often involve native cryptocurrency and use consensus based on a proof of work (PoW). On the other hand, a permissioned blockchain database provides a system which can secure inter-actions among a group of entities which may share a common goal but which may not fully trust one another, such as businesses that exchange funds, goods, information, and the like.

A blockchain operates arbitrary, programmable logic tailored to a decentralized storage scheme and referred to as "smart contracts" or "chaincodes." In some cases, specialized chaincodes may exist for management functions and parameters which are referred to as system chaincode. Smart contracts are trusted distributed applications which leverage tamper-proof properties of the blockchain database and an underlying agreement between nodes which is referred to as an endorsement or endorsement policy. In general, blockchain transactions typically must be "endorsed" before being committed to the blockchain while transactions which are not endorsed are disregarded. A typical endorsement policy allows chaincode to specify endorsers for a transaction in the form of a set of peer nodes that are necessary for endorsement. When a client sends the transaction to the peers specified in the endorsement policy, the transaction is executed to validate the transaction. After validation, the transactions enter an ordering phase in which a consensus protocol is used to produce an ordered sequence of endorsed transactions grouped into blocks.

Nodes are the communication entities of the blockchain system. A "node" may perform a logical function in the sense that multiple nodes of different types can run on the same physical server. Nodes are grouped in trust domains and are associated with logical entities that control them in various ways. Nodes may include different types, such as a client or submitting-client node which submits a transaction-invocation to an endorser (e.g., peer), and broadcasts transaction-proposals to an ordering service (e.g., ordering node). Another type of node is a peer node which can receive client submitted transactions, commit the transactions and maintain a state and a copy of the ledger of blockchain transactions. Peers can also have the role of an endorser, although it is not a requirement. An ordering-service-node or orderer is a node running the communication service for all nodes, and which implements a delivery guarantee, such as a broadcast to each of the peer nodes in the system when committing transactions and modifying a world state of the blockchain, which is another name for the initial blockchain transaction which normally includes control and setup information.

A ledger is a sequenced, tamper-resistant record of all state transitions of a blockchain. State transitions may result from chaincode invocations (i.e., transactions) submitted by participating parties (e.g., client nodes, ordering nodes, endorser nodes, peer nodes, etc.). A transaction may result in a set of asset key-value pairs being committed to the ledger as one or more operands, such as creates, updates, deletes, and the like. The ledger includes a blockchain (also referred to as a chain) which is used to store an immutable, sequenced record in blocks. The ledger also includes a state database which maintains a current state of the blockchain. There is typically one ledger per channel. Each peer node maintains a copy of the ledger for each channel of which they are a member.

A chain is a transaction log which is structured as hash-linked blocks, and each block contains a sequence of N transactions where N is equal to or greater than one. The block header includes a hash of the block's transactions, as well as a hash of the prior block's header. In this way, all transactions on the ledger may be sequenced and cryptographically linked together. Accordingly, it is not possible to tamper with the ledger data without breaking the hash links. A hash of a most recently added blockchain block represents every transaction on the chain that has come before it, making it possible to ensure that all peer nodes are in a consistent and trusted state. The chain may be stored on a peer node file system (i.e., local, attached storage, cloud, etc.), efficiently supporting the append-only nature of the blockchain workload.

The current state of the immutable ledger represents the latest values for all keys that are included in the chain transaction log. Because the current state represents the latest key values known to a channel, it is sometimes referred to as a world state. Chaincode invocations execute transactions against the current state data of the ledger. To make these chaincode interactions efficient, the latest values of the keys may be stored in a state database. The state database may be simply an indexed view into the chain's transaction log, it can therefore be regenerated from the chain at any time. The state database may automatically be recovered (or generated if needed) upon peer node startup, and before transactions are accepted.

Some benefits of the instant solutions described and depicted herein include storing validated states of iterative simulations in frames of iterations. That is, states are computed over iterations by the client, compressed in frames, and validated by the endorsers. Upon validation, these frames are added to the blockchain sequentially. In the case of enumerative experiments (non-iterative evaluations of outputs for given inputs), the blockchain may store validated frames of input-output pairs. The state of the system, as it evolves over the iterations, may be stored on the blockchain in frames of iterations. The frames are characterized by a checkpoint at the beginning and defined adaptively to include states as long as the update (difference) are within a defined tolerance threshold. The maximum size of a frame may be appropriately chosen, and each frame may include as many states as allowed by the size. Furthermore, the validation performed by the endorsers is parallelized such that the frames can be validated in parallel. The non-iterative experiments can also be parallelized, whereas the iterative simulation is run sequentially by the client.

In addition, the example embodiments also provide framing and compression framework for overhead reduction. Each frame may be compressed differently based on whether the simulation is iterative or non-iterative. The system also provides successive refinement of invalidated states (which are not endorsed) to correct approximation error for parameter agnostic design. For the non-iterative simulations, a minimum spanning tree (MST) based frame construction for enumerative (non-iterative) simulations may be performed for compression. The system also provides coded computing-based task allocation for validation time reduction, and validation for simulations with external randomness using probabilistic validation guarantee.

Blockchain is different from a traditional database in that blockchain is not a central storage but rather a decentralized, immutable, and secure storage, where nodes must share changes to records in the storage. Some properties that are inherent in blockchain and which help implement the blockchain include, but are not limited to, an immutable ledger, smart contracts, security, privacy, decentralization, consensus, endorsement, accessibility, and the like, which are further described herein. According to various aspects, the validated states of a computational process via a distributed platform is implemented due to immutability, security, decentralization, consensus, endorsement, and accessibility, which are inherent and unique to blockchain.

In particular, because the record of validated states is immutable, verification of the simulation for consistency of the computations translates to checking the consistency of the hash chain on the blockchain. This is much easier than running the entire simulation and thus makes verification simple to guarantee. Accountability can be guaranteed by the blockchain because it is feasible to trace not only the source of the computations, but also identify errors in the computation and their origin. This establishes provenance in the computational system.

The system further provides security from adversaries in the computation, endorsement, and storage because the states, once validated, can be trusted at any later point in time by referring to the blockchain. This allows for trust that is transferrable across usage instances of the simulation results. Furthermore, because the entire process of validation, computation, and storage is decentralized, there exists no central point of attack to corrupt the simulation results. The distributed nature also allows for a reduction of computational costs and time owing to parallelizability of the process.

Consensus of validations among the peers is critical to enabling trust as it is essential that at least a sufficient fraction of peers accept the computations as being correct, and also that the data stored on the copies of the ledger are up to date across the peers. Furthermore, endorsements of the steps of the computation by independent endorsers in the network allows for trust in the validation process as the random assignment of endorsers in the network implies that the effect of adversarial peers is negated through the redundancy, and the overall nature of the network to function honestly. Because the blockchain ledger is distributed, and shared among all peers, any peer who wishes to access the results of the simulation or draw inferences from the iterates is able to do this easily by referring to their local copy of the ledger The example embodiments provide numerous benefits over a traditional database. For example, the design of the system requires a data structure that can be shared among the peers in the network in a consistent manner, is immutable, and can be updated in a distributed manner. All these translate precisely to a blockchain. Additionally, the blockchain also allows for a simple consistency check that translates to verifiability of the simulation validity. Whereas it may be technically feasible for another data structure to offer these features, there is not a single unifying mechanism that offers all the above described requirements. In this sense, the blockchain proves to be the optimal choice.

The blockchain may be used in conjunction with a compression schema that first performs a novel compression of the validated states to allow for scalability of the implementation. In the absence of the compression schema, the storage and communication overheads grow prohibitively large, preventing the scaling of the design to large-scale simulations, and large networks. Furthermore, the validation process defined here is new when compared to the notions of endorsements as applicable in cryptocurrencies and smart contracts, in that it is based on a re-computation of a function to test for report deviation, as against something like a check of availability of resources.

The example embodiments also change how data may be stored within a block structure of the blockchain. For example, related blockchains may store information such as transactions (transfer of property), and smart contracts (instruction sets to be executed). Meanwhile, in the example embodiments, the data being stored is the validated states of a computational process. That is, each block consists of one or more frames that include a compressed checkpoint of a state of the computation and quantized state updates obtained from delta encoding of successive iterates in the frame. Additional metadata that may be stored can include the ID of the client performing the simulation, the endorsers who validated the states, the iterate index, and other extraneous information used for performing the simulation. By storing validated states of a computation within data blocks of a blockchain, the validated states of the computation may be appended to an immutable ledger through a hash-linked chain of blocks and may be used validate subsequent iterations of the computation as well as perform compression.

Various technical advantages are provided by the example embodiments described herein. For example, the embodiments provide a distributed validation framework for large-scale iterative simulations by reporting states of the simulation to subsets of endorsers who validate states in parallel. In addition, a compression schema is provided that identifies checkpoints, constructs frames of states of the simulation and performs delta encoding and lattice vector quantization to compress the frames before dispatching for validation in parallel. In addition, a blockchain ledger is provided for storing validated, compressed frames of states from the simulation using an orderer to check for endorsement consistency. Furthermore, an MST-based frame construction method is provided to create trees of states to perform compression in enumerative experiments. Furthermore, a coded computing-based endorsement allocation is provided to reduce computational time for state validation.

FIG. 1 illustrates a blockchain network 100 for validating and storing simulation data, according to example embodiments. Referring to FIG. 1, the blockchain network 100 includes a client node 110 which may perform large-scale computation for training a model or which may receive large-scale computation data from another system or systems. The large-scale computation may generate simulation data for training a model/data or for computing a non-iterative process. The simulation data may be converted into data structures such as frames, data points, or the like, based on checkpoints within the simulation data and the data structures may be compressed to reduce overhead.

Checkpoints may be used to identify the next frame, etc. The checkpoints may be determined by the client node based on iterative data, non-iterative input/output pairs, and the like. The frames may include successive frames of data as the state of the model evolves. The blockchain network 100 also includes multiple subsets of endorsing nodes 120, 130, and 140, which may be mutually exclusive from one another, and which may be used to validate frames or other data structures of simulation state data in parallel. When a frame of data is validated by one of the endorsing node subsets 120, 130, and/or 140, the frame may be sent to orderer 150 for inclusion within a data block among a blockchain 160, also referred to herein as a hash-linked chain of blocks.

The simulation may be an experiment that benefits from multiple computational nodes. As a non-limiting example, a malaria data scientist (MDS) may run experiments to simulate a spreading of a disease using one or more computational model agents such as OpenMalaria or Epidemiological Modeling software (EMOD). In this example, the model runs many distinct simulations to compare effects of changes in model structure or parameters. The goal of the experiments is to come up with validated policies and intervention strategies to eradicate diseases. The system herein may be used to establish accountability and transparency in computational results of simulations.

Referring again to FIG. 1, a distributed validation is performed by the subsets of endorsing nodes 120, 130, and 140. A consensus of re-computation of local operations to endorse may be generated by the subsets and reported computations. Once validated by a subset, the validated frame of data may be stored on the blockchain 160 and shared among all nodes on a blockchain network which may include client node 110, endorsing nodes (subsets 120-140), other peer nodes, and/or the like. The blockchain 160 creates a shared, immutable, append-only record of validated frames between successive checkpoints. Furthermore, lossy compression may be used to compress the state data within each frame thereby reducing storage cost and computational overhead.

The client node 110 may also be referred to as an agent performing computation. The client node 110 may store a state of the model, data, etc., at a checkpoint in the form of a frame. The frame may include compressed state updates (differences) within the frame and the state data within a previous frame. The frame may be part of a larger group of frames that are generated as successive frames. The frames may be verified by endorsers (other agents) within the endorsing node subsets 120, 130, and 40, by recomputing.

The validated frames may be added to the blockchain 160 which is shared among the endorsers, peers, clients, etc. of the blockchain network.

A state of the system evolves over iterations of the simulation as $$X_{t+1} = f(X_t, \theta_t)$$

$X_t \in \mathbb{R}^d$, system state vector
$\theta_t \in \mathbb{R}^{d'}$ is a shared source of (possibly random) information
$f: \mathbb{R}^d \times \mathbb{R}^{d'} \to \mathbb{R}^d$, atomic operation, shared by all peers
Validity of simulation ⇔ validity of intermediate states $\{X_1, X_2 \ldots\}$
Assume $f(\bullet)$ is L-Lipschitz continuous, i.e., $$\|f(x_1) - f(x_2)\| \leq L \|x_1 - x_2\|$$

The simulation may be an iterative evolution of the state $X_{t+1} = f(X_t, \theta_t)$. The client node 110 may report the state $X_t$ at checkpoints $t \in \{T_1, T_2, \ldots\}$. For iterations between checkpoints, $t \in (T_1, T_2)$, report compressed update $\widetilde{\Delta X}$. In response, the endorsing subset of nodes may recompute the frame of data based on previously validated states reported by the client node 110, which are compared with the received frame. Furthermore, the orderer 150 may add a validated frame to the blockchain 160 in a sequential manner.

Furthermore, the client node 110 may use lossy compression (similar to a video encoding process) to report state updates (differences), $\|\widetilde{\Delta X}_t - \Delta X_t\| \leq \epsilon$, for small $\epsilon$. Here, a frame width (checkpointing frequency) may be determined adaptively such that $\|\Delta X_t\| \leq \Delta_{quant}$ for all slots in the frame, and a number of iterates in a frame may be limited by a maximum number. The current state may be stored at a beginning of a frame (checkpoint) using Lempel-Ziv-like lossy compressor. Based on rate of compression, costs of communication and storage vary. If the simulation is a chaotic simulation, the system may require smaller frames and larger compression rates, however, embodiments are not limited thereto.

In the network 100 of FIG. 1, endorsement parallelization is implemented because individual frames can be validated by disjoint endorser subsets in parallel. Here, every endorser validates only a fraction of the total frames generated from the simulation thereby significantly reducing computational overhead. Furthermore, endorsers need not wait for peers with large communication delays or poor computational power and can focus on the frame they've been tasked with endorsing. When an endorsing subset is unable to validate a frame of data, the endorsing subset may notify the client node 110. If confident, the client node 110 can communicate report update using successive refinement without re-computation. Otherwise, the client node 110 can recompute the frame and send it to the subset for endorsing, again.

To determine a frame endorsement, an endorsing peer node may determine an acceptable margin of deviation $\Delta_{marg}$ for simulation. Accordingly, a computation may only be declared as valid if the state of the model/simulation reported by the client node 110 is within the acceptable margin of deviation for the recomputed state. The subset of peers endorses atomic computations in frame and add to the blockchain upon consensus. Furthermore, margins can be adaptively reduced, and compression schemes appropriately updated to obtain tighter requirements closer to termination of simulation (or convergence of state).

The orderer 150 may receive endorsements for different frames from the different subsets of endorsing nodes 120, 130, and 140. The endorser 150 may generate or otherwise initialize data blocks for storage on the blockchain 160. Here, the endorser may order the frames sequentially to be added to the blockchain 160 upon consensus. The stored frames are immutable and can be used for verifying checkpoints and frames by endorsing nodes. The state updates in a frame can also be sub-sampled by the orderer 150 and stored for lesser storage cost.

In some embodiments, the computation involves an iterative computation such as a refining of a deep learning model, machine learning algorithm, etc. As another example, the experiment could involve a non-iterative simulation which includes a large set of input parameters using an atomic computational block and generating an output for each input. In this example, states of the simulation may be input-output pairs which provide no natural grouping into frames making compression difficult.

However, frames may be constructed via a minimum-spanning tree (MST) and subsequently compressed. Here, constructing a frame of state updates necessary for efficient delta encoding and compressive reporting of state updates may be performed. In this example, a pairwise distance matrix $\mathcal{W} = [\|Z_i - Z_j\|]_{i,j}$, where $Z_i = (X_i, Y_i)$, may be utilized. The client node 110 may generate the MST of weighted graph $G([n], \mathcal{W})$. Threshold edge weights by $\Delta_{quant}$, and prune trees to include at most M nodes each. Furthermore, each tree may corresponds to a frame and may include creating a checkpoint with the root of the tree and communicating quantized state updates along edges of tree. Furthermore, the same compression schemes may be used as described for iterative data.

In the example of non-iterative simulation data, the client node 110 may report the compressed frame and the MST structure relating states to an endorsing subset. In response, the endorsing nodes may decompress states $(\tilde{X}_i, \tilde{Y}_i)$. The endorsers may recompute outputs from reported inputs: $\hat{Y}_i = f(\tilde{X}_i)$ and validate a state report in a frame if $\|\hat{Y}_i - \tilde{Y}_i\| \leq \Delta_{marg}$. Furthermore, the endorser may validate the frame if all states are valid. When number of computations (inputs) is large, frame construction, local validation, and endorsement parallelization reduces costs and ensures computational validity.

Simulations are typically sensitive to external source of randomness ($\theta_t$), i.e., $X_{t+1} = f(X_t, \theta_t)$. Without access to randomness, individual endorsers can not recompute the reported state. A possible solution, store $\theta_t$ at each iteration which creates very high storage cost. As another example, validate by testing deviation of reported state from average of states recomputed by independent endorsers. Here, if a source of randomness is the same, endorsers collectively behave along the expected path, for well-behaved functions The description herein assumes endorser honesty, and computational homogeneity for timely validation. However, if endorsers are erroneous, adversarial, or are slow to compute, validation can be expensive in terms of time to endorse each frame. For example, if an endorser is a straggler, then obtaining endorsement can be unduly delayed. For distributed trust using untrusting peers, there is a need for redundancy in validation by allocation of multiple endorsers for each state validation. Accordingly, endorsement policies (such as at least τ validations necessary) can be defined depending on number of adversarial peers in the system.

In some embodiments, using coded computing for allocation of states to be validated by an endorser in a frame, can reduce the number of computations performed by each endorser. In doing so, the system reduces the time for validation under threshold endorsement policies but uses more endorsers.

The system described herein provides a number of advantages for traditional simulation-based systems. For example, accountability is ensured because the environment guarantees provenance in design and a method to track local computations in multi-agent systems. Transparency is created by trust established among nodes through transparency in the form of regular audits and local computation validation via the blockchain. The frame design, endorsement, and validation can be adapted according to the state evolution. Here, by varying validation margin, trust requirements can be appropriately altered. The platform uses elements that are fairly general and can be implemented using any one of a wide variety of design parameters and algorithms. Furthermore, the design is agnostic to specifics of simulation and can be implemented as long as simulation is decomposable into reproducible atomic computations. The system requires fairly simple building blocks to create the platform which can be appropriately developed from existing compression and blockchain technology. Furthermore, by storing intermediate evaluations of system state, the platform guarantees reliable data and model sharing, and collaborative research.

Figure 2A:
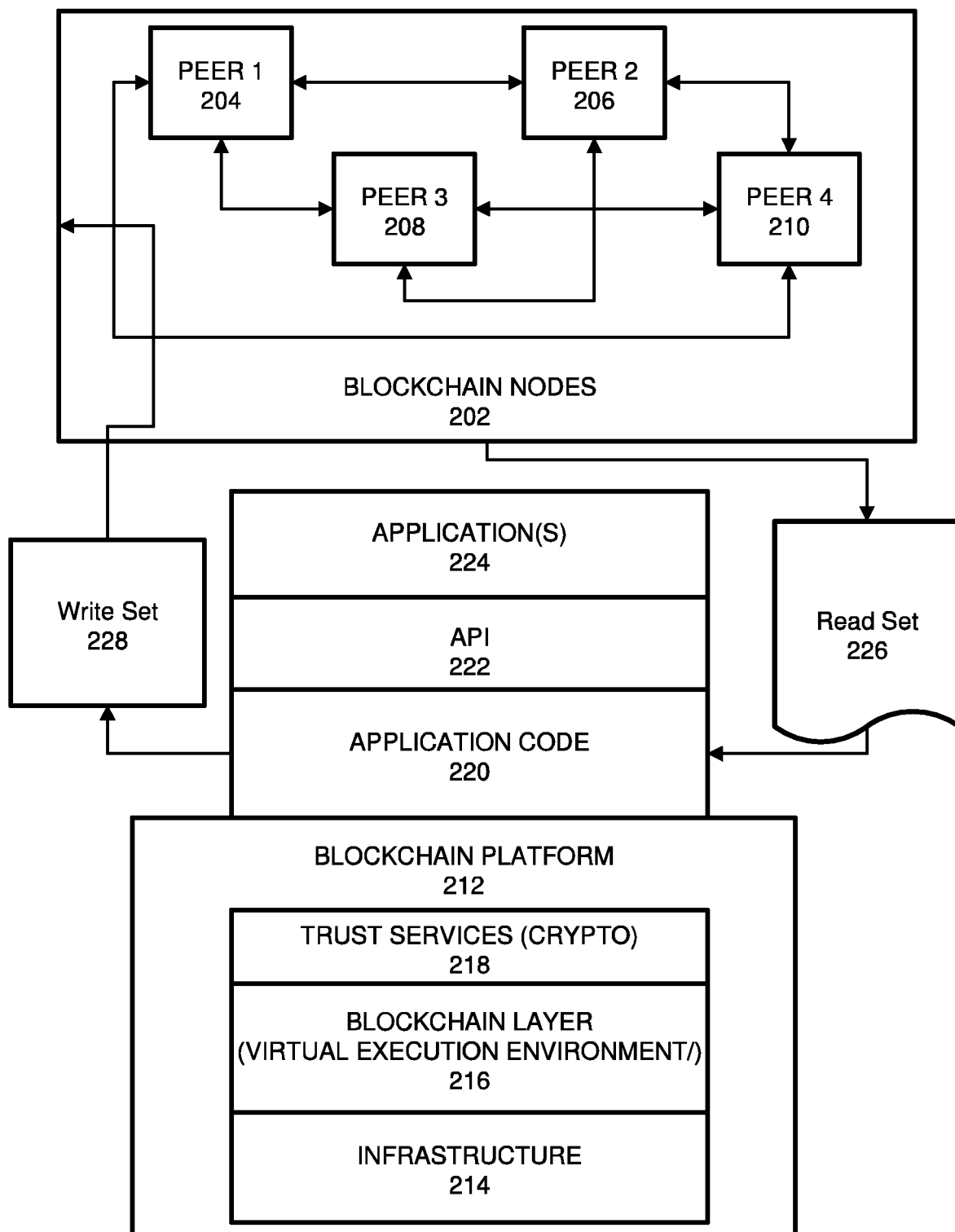
FIG. 2A is a diagram illustrating a peer node blockchain architecture configuration for an asset sharing scenario, according to example embodiments.

FIG. 2A illustrates a blockchain architecture configuration 200, according to example embodiments. Referring to FIG. 2A, the blockchain architecture 200 may include certain blockchain elements, for example, a group of blockchain nodes 202. The blockchain nodes 202 may include one or more nodes 204-210 (four nodes are depicted by example only). These nodes participate in a number of activities, such as blockchain transaction addition (e.g., simulation data frames, etc.) and validation processes (consensus). One or more of the blockchain nodes 204-210 may endorse transactions based on endorsement policy and may provide an ordering service for all blockchain nodes in the architecture 200. A blockchain node may initiate a blockchain authentication and seek to write to a blockchain immutable ledger stored in blockchain layer 216, a copy of which may also be stored on the underpinning physical infrastructure 214. The blockchain configuration may include one or more applications 224 which are linked to application programming interfaces (APIs) 222 to access and execute stored program/application code 220 (e.g., chaincode, smart contracts, etc.) which can be created according to a customized configuration sought by participants and can maintain their own state, control their own assets, and receive external information. This can be deployed as a transaction and installed, via appending to the distributed ledger, on all blockchain nodes 204-210.

The blockchain base or platform 212 may include various layers of blockchain data, services (e.g., cryptographic trust services, virtual execution environment, etc.), and underpinning physical computer infrastructure that may be used to receive and store new transactions and provide access to auditors which are seeking to access data entries. The blockchain layer 216 may expose an interface that provides access to the virtual execution environment necessary to process the program code and engage the physical infrastructure 214. Cryptographic trust services 218 may be used to verify transactions such as asset exchange transactions and keep information private.

The blockchain architecture configuration of FIG. 2A may process and execute program/application code 220 via one or more interfaces exposed, and services provided, by blockchain platform 212. The code 220 may control blockchain assets. For example, the code 220 can store and transfer data, and may be executed by nodes 204-210 in the form of a smart contract and associated chaincode with conditions or other code elements subject to its execution. As a non-limiting example, smart contracts may be created to execute reminders, updates, and/or other notifications subject to the changes, updates, etc. The smart contracts can themselves be used to identify rules associated with authorization and access requirements and usage of the ledger. For example, the read set 226 may be processed by one or more processing entities (e.g., virtual machines) included in the blockchain layer 216. The write set 228 may include changes to key values. The physical infrastructure 214 may be utilized to retrieve any of the data or information described herein.

Within chaincode, a smart contract may be created via a high-level application and programming language, and then written to a block in the blockchain. The smart contract may include executable code which is registered, stored, and/or replicated with a blockchain (e.g., distributed network of blockchain peers). A transaction is an execution of the smart contract code which can be performed in response to conditions associated with the smart contract being satisfied. The executing of the smart contract may trigger a trusted modification(s) to a state of a digital blockchain ledger. The modification(s) to the blockchain ledger caused by the smart contract execution may be automatically replicated throughout the distributed network of blockchain peers through one or more consensus protocols.

The smart contract may write data to the blockchain in the format of key-value pairs. Furthermore, the smart contract code can read the values stored in a blockchain and use them in application operations. The smart contract code can write the output of various logic operations into the blockchain. The code may be used to create a temporary data structure in a virtual machine or other computing platform. Data written to the blockchain can be public and/or can be encrypted and maintained as private. The temporary data that is used/generated by the smart contract is held in memory by the supplied execution environment, then deleted once the data needed for the blockchain is identified.

A chaincode may include the code interpretation of a smart contract, with additional features. As described herein, the chaincode may be program code deployed on a computing network, where it is executed and validated by chain validators together during a consensus process. The chaincode receives a hash and retrieves from the blockchain a hash associated with the data template created by use of a previously stored feature extractor. If the hashes of the hash identifier and the hash created from the stored identifier template data match, then the chaincode sends an authorization key to the requested service. The chaincode may write to the blockchain the data associated with the cryptographic details.

FIG. 2B illustrates an example of a communication sequence 250 between nodes of a blockchain network, according to example embodiments. In the example of FIG. 2B, a client node 260 performs computations to generate simulated data which is stored in frames. Furthermore, the frames of simulated data are distributed among a plurality of endorsing peer nodes 271, 272, and 273. When the frames are validated by the endorsing peer nodes 271, 272, and 273, the frames are transferred to an ordering node 274 which orders the endorsed frames into one or more blocks and transmits the ordered blocks to nodes of the blockchain network for storage on a distributed ledger replicated across the nodes.

Referring to FIG. 2B, in 281, the client node 260 transmits a first frame N to endorsing peer node 271 which is included in a first subset of endorsing peer nodes. Likewise, in 282 the client node 260 transmits a second frame N+1 to endorsing peer node 272 which is included in a second subset of endorsing peer nodes. Furthermore, in 283, the client node 260 transmits a third frame N+2 to endorsing peer node 273. The frames N, N+1, N+2, and the like, may be generated by the client node 260 or another system which provides the simulation data to the client node 260. Each frame may include a state of the model/data being simulated at each step or stage represented by each frame from among frames N, N+1, and N+2. In response, the client node 260 may identify checkpoints within the simulation data, compress the data, and generate the data frames N, N+1, N+2, etc. based on the identified checkpoints.

In 284, the endorsing peer node 271 attempts to validate the frame N. Likewise, in 285 the endorsing peer node 272 attempts to validate frame N+1, and in 286, the endorsing peer node 273 attempts to validate the frame N+2. Here, the validations in 284, 285, and 286 may be performed in parallel. To perform the endorsement process, each endorsing peer node 271-273 may identify a previous validated state of the simulation, recompute the simulation to generate a local state of the model, and compare the locally computed state to the state included in the respective frame received from the client node 260. In response to the computed state being within an acceptable range of deviation with the received state, the endorsing peer node determines the frame is valid, and endorses the frame.

In this example, endorsing peer node 272 and endorsing peer node 273 determine that frames N+1 and N+2 are valid, respectively. Accordingly, in 289 and 290 the endorsing peer nodes 272 and 273 transmit endorsements to the ordering node 274. Meanwhile, endorsing peer node 271 determines that frame N is not valid based on its local computation of state of model at a checkpoint corresponding to frame N. Here, the endorsing peer node 271 determines that a difference between the locally computed state and the received state included in frame N differ by more than an acceptable range of deviation. Accordingly, in 288, the endorsing peer node 271 rejects the state report and sends notice to the client node 260. In response, the client node 260 may refine the simulation without re-computation, in some cases, or it may recompute the state of the simulation. In 289, the client node 260 resubmits the frame N to the endorsing peer node 271 based on the updated/refined state. In response, in 291, the endorsing peer node 271 attempts to validate the updated state received in 289, and determines to validate the frame N. Accordingly, in 292, the endorsing peer node 271 transmits an endorsement of frame N to the ordering node 274.

In response to receiving endorsements of all successive frames N, N+1, N+2, etc., the ordering node 274 orders the frames based on timestamps of the original frame. For example, the ordering node 274 may store the frames in a queue, or the like. Furthermore, the ordered frame data including frames N, N+1, and N+2, may be stored in a data block in 293, and transmitted to the endorsing nodes 271, 272, and 273 in 294 such that the data block including the ordered frame data can be committed to a distributed ledger, in 295. Here, the data block may be committed to a replicated copy of the distributed ledger (e.g., blockchain, world state DB, etc.) that is distributed and shared among the endorsing peer nodes 271-273 (and possibly other nodes such as client node 260, ordering node 274, and other nodes not shown).

Figure 3:
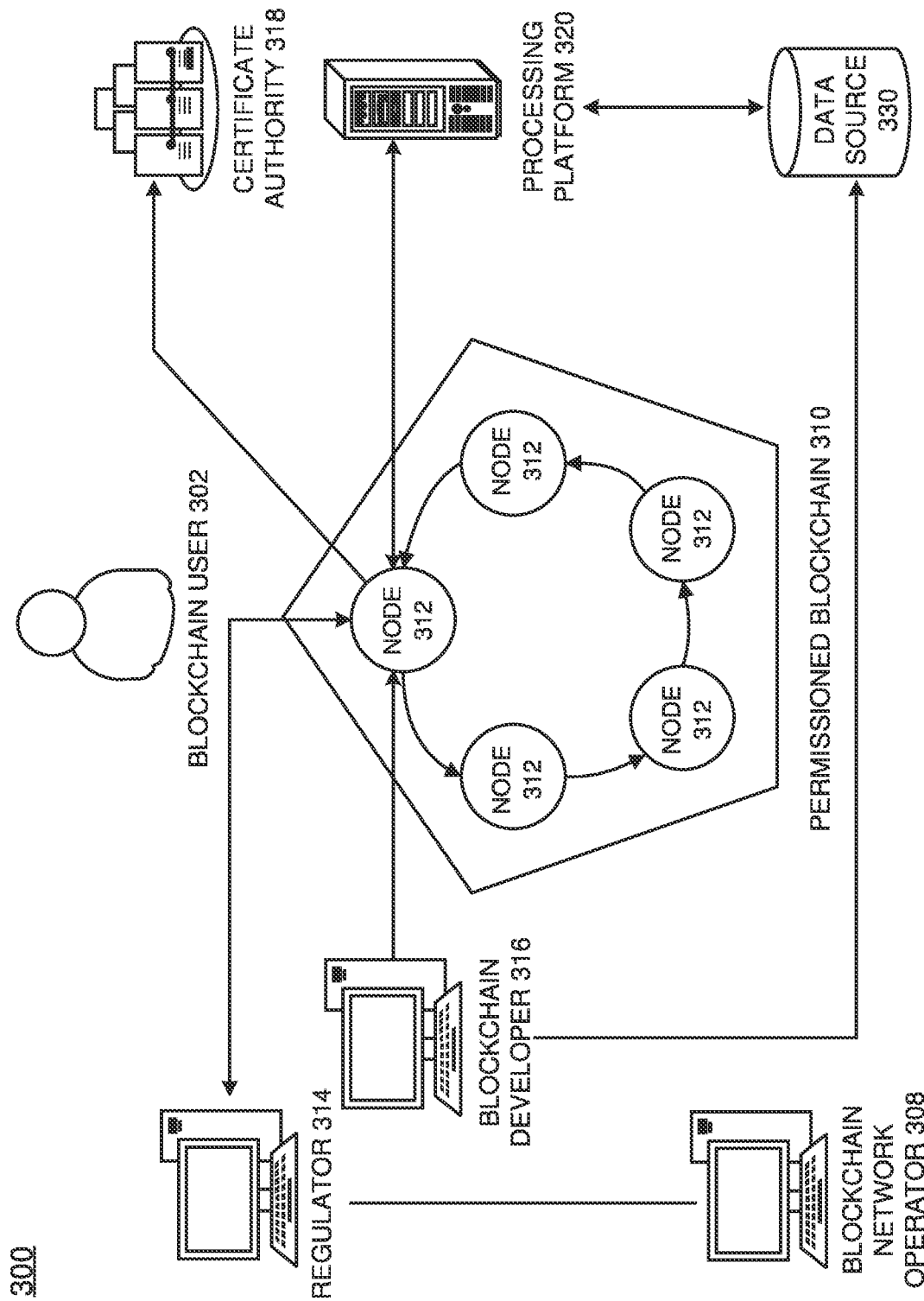
FIG. 3 is a diagram illustrating a permissioned blockchain network, according to example embodiments.

FIG. 3 illustrates an example of a permissioned blockchain network 300, which features a distributed, decentralized peer-to-peer architecture, and a certificate authority 318 managing user roles and permissions. In this example, the blockchain user 302 may submit a transaction to the permissioned blockchain network 310. In this example, the transaction can be a deploy, invoke or query, and may be issued through a client-side application leveraging an SDK, directly through a REST API, or the like. Trusted business networks may provide access to regulator systems 314, such as auditors (the Securities and Exchange Commission in a U.S. equities market, for example). Meanwhile, a blockchain network operator system of nodes 308 manage member permissions, such as enrolling the regulator system 310 as an "auditor" and the blockchain user 302 as a "client." An auditor could be restricted only to querying the ledger whereas a client could be authorized to deploy, invoke, and query certain types of chaincode.

A blockchain developer system 316 writes chaincode and client-side applications. The blockchain developer system 316 can deploy chaincode directly to the network through a REST interface. To include credentials from a traditional data source 330 in chaincode, the developer system 316 could use an out-of-band connection to access the data. In this example, the blockchain user 302 connects to the network through a peer node 312. Before proceeding with any transactions, the peer node 312 retrieves the user's enrollment and transaction certificates from the certificate authority 318. In some cases, blockchain users must possess these digital certificates in order to transact on the permissioned blockchain network 310. Meanwhile, a user attempting to drive chaincode may be required to verify their credentials on the traditional data source 330. To confirm the user's authorization, chaincode can use an out-of-band connection to this data through a traditional processing platform 320.

FIG. 4A illustrates a process 400A of a client node 410 generating frames 412 of a state of a simulation, according to example embodiments. Referring to FIG. 4A, the client node 410 may execute a deep learning model, a large-scale non-iterative experiment, or the like, which generates multiple successive frames 412. Each frame 412 may be generated based on checkpoints 413 identified by the client node 410 within the simulated data. Furthermore, the frames 412 may be compressed to generate compressed data frames 414.

According to various embodiments, the simulation may be decomposed into simpler, easy to validate steps/iterations, which can be integral to performing the distributed validation across peers in the network. In particular, the decomposition allows multiple frames to be validated in parallel across independent endorsers, allowing for a reduction of the validation time requirement. Because the decomposition allows for the validation to be performed along with the simulation process, not only are simultaneous validations of the computations performed, but also trust guarantees or points of trust are created that are transferable to a later point in time when the simulations might be referenced for endorsement of subsequent frames.

A sequence of steps of state data of a model may be grouped together into a frame and appended to the blockchain. However, this does not necessarily limit the implementation to add a separate block for each frame. One could use ideas such as Merkle tree structures to group multiple frames within a single block without any loss of generality, as long as the frames are added in sequence (of iterations). Similar to video compression, the frames of simulation data may be compressed using delta encoding, successive refinement, and/or vector quantization to reduce the amount of data needed for storage and overhead for performing communication. The simulation or computation may be iterative or non-iterative. For example, the iterative case accounts for a simple way to construct frames and perform the delta encoding. Meanwhile, in the case of non-iterative simulations, a minimum spanning tree-based policy may be used to group states according to closeness, thereby allowing for efficient compression.

According to various embodiments, the checkpoint 413 may be generated or determined under multiple different scenarios. For example, if a frame includes a preset maximum number of states, then a new frame may be created (with the first state being a checkpoint) so as to ensure that the each endorser at most validates a fixed number of states in each frame. As another example, a checkpoint may be created when successive states deviate by a magnitude exceeding a chosen maximum value. That is, when the states differ by a significant extent, a checkpoint is created.

After generating the compressed frames 414, the individual compressed frames 414 may be distributed among multiple subsets of endorsing peer nodes for validation. Here, a subset of endorsing peer nodes may include at least one endorsing peer node. By distributing endorsement across multiple subsets, the endorsement process (including decompression, re-computation, deviation determination, etc.) may be performed in parallel thereby significantly reducing processing time. Furthermore, each endorsing node does not have to compute/validate every frame. Rather, the endorsing nodes may only endorse a fraction of the frames while retrieving trusted validation data from the blockchain.

Figure 4B:
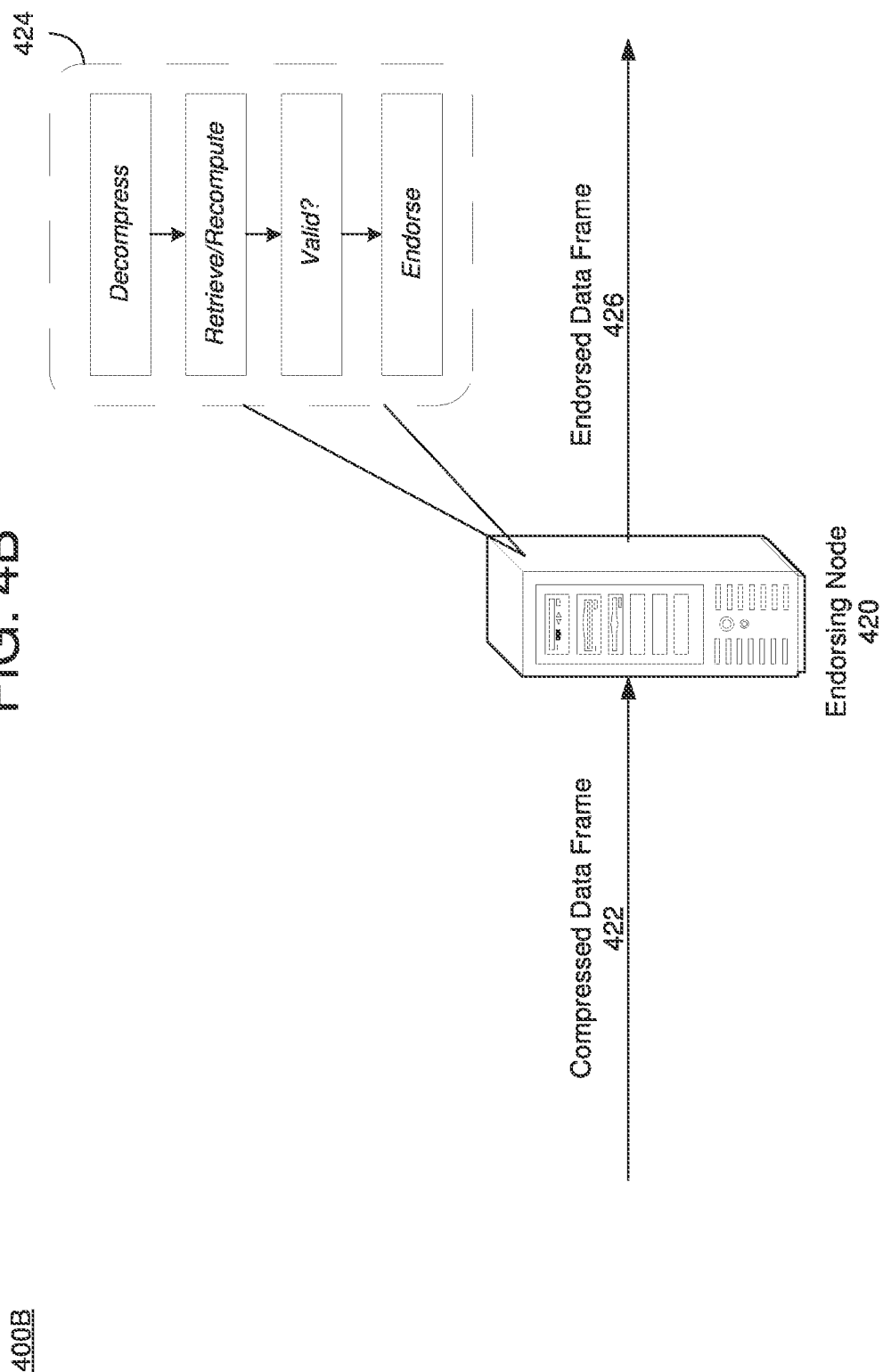
FIG. 4B is a diagram illustrating a process of an endorsing node validating a frame of simulation data, according to example embodiments.

FIG. 4B illustrates a process 400B of an endorsing node 420 validating a compressed frame 422 of simulation data, according to example embodiments. In this example, the frame of compressed data may include state information of a simulation. The state is the intermediate values that are needed to continue the iterations of a computation. In the case of an epidemiological simulation, for example, the state may include a set of values that describe the disease spread. In the case of training a deep neural network, for example, the state may be a set of all weights applied to nodes of a neural network, and the like. In some embodiments, the training data may have already been transmitted to all peers in advance.

During an endorsement process 424, each endorsing peer node may decompress the frame 422 to reveal the state data of the simulation provided from the client. The endorsing peer node 420 may retrieve a previous state of the simulation from the blockchain. Here, the previous state may be the most recent state that has been successfully validated and committed to the blockchain which may be stored locally on the endorsing peer node 420. The endorsing peer node 420 may recompute the current state of the simulation which corresponds to the received state in the compressed frame 422 and determine whether the locally generated state is similar enough to the state in the compressed frame 422 to validate the frame 422 for endorsement. If the state values differ by more than a predetermined threshold, the endorsing peer node 420 may transmit notification to the client node indicating the endorsement is declined. In response, the client node may refine the state of the frame 422 and resubmit the frame 422 after updating the state based on the refinement. This process can be repeated until the frame 422 is validated. Meanwhile, once validated, the validated frame 426 may be submitted to an ordering node for inclusion on the blockchain.

FIG. 4C illustrates a process 400C of an ordering node 430 arranging frames of simulation data in blocks, according to example embodiments. Referring to FIG. 4C, a plurality of frames are validated by a plurality of subsets of endorsing peers and provided to the ordering node 430. In response, the ordering node 430 may arrange the frames in a sequential order (or successive order such as 1, 2, 3, etc.) within a queue 432 based on a timestamp or other information within the frames added when the frame was generated by the client. Furthermore, the arranged frames may be ordered within one or more data blocks 434 which may be transmitted to nodes of the blockchain network and committed to the distributed ledger shared among the nodes.

FIG. 5A illustrates a method 510 of generating frames of simulation data for storage on a blockchain, according to example embodiments. For example, the method 510 may be performed by a peer node of a blockchain such as a client node, or the like. As another example, the method may be performed by any computing device with a processor and a storage such as a server, a database, a cloud platform, multiple devices, and the like. Referring to FIG. 5A, in 511, the method may include obtaining data of a simulation. For example, a simulation such as an iterative computation or a non-iterative computation may be performed and may generate simulation data. In some embodiments, the simulation may be performed by another device which transmits the simulation data to the peer node, etc.

In 512, the method may include identifying checkpoints within the simulation data, and in 513, the method may include generating a plurality of successive frames of the simulation data based on the identified checkpoints, where each frame identifies an evolving state of the simulation with respect to a previous frame among the successive frames. For example, the checkpoints may be identified based on iterations of the simulation, input/output pairs of a non-iterative simulation, and the like. For example, if a frame of simulation data includes a preset maximum number of states, then a new frame is created (with the first state being a checkpoint) so as to ensure that each endorser at most validates a fixed number of states in each frame. As another example, a checkpoint may be created when successive states deviate by a magnitude exceeding a chosen maximum value. That is, when the states differ by a significant extent, a checkpoint is created. The checkpointing may be used to identify an end of a previous frame and a start of a next successive frame within the computational data. In some embodiments, the frames may further be compressed based on a type of computation (e.g., iterative, non-iterative, or the like).

In some embodiments, a width of each frame may be adaptively determined based on a frequency of checkpoints that correspond to the respective frame within the received data of the simulation. In some embodiments, the simulation may include one of an iterative simulation of a model being trained where each iteration further refines a state of the model based on one or more algorithms, neural networks, and the like. As another example, a simulation may include a non-iterative simulation which includes a set of input and output pairs being processed.

In 514, the method may include transmitting the generated successive frames to nodes of a blockchain network for inclusion in one or more data blocks within a hash-linked chain of data blocks. For example, each frame may be transmitted to different endorsing peer groups or subsets of nodes within the blockchain network. In some embodiments, the method may further include storing an iteration ID within each frame from among the successive generated successive frames, wherein the iteration ID identifies a respective iteration of the iterative simulation associated with the respective frame. In some embodiments, the method may further include receiving a message from a blockchain peer node indicating a state associated with a frame from among the generated successive frames has been invalidated. In response, the method may further include one or more of recomputing the state and refining the state of the invalidated frame to generate an updated frame and transmitting the updated frame to the blockchain peer node for validation.

Figure 5B:
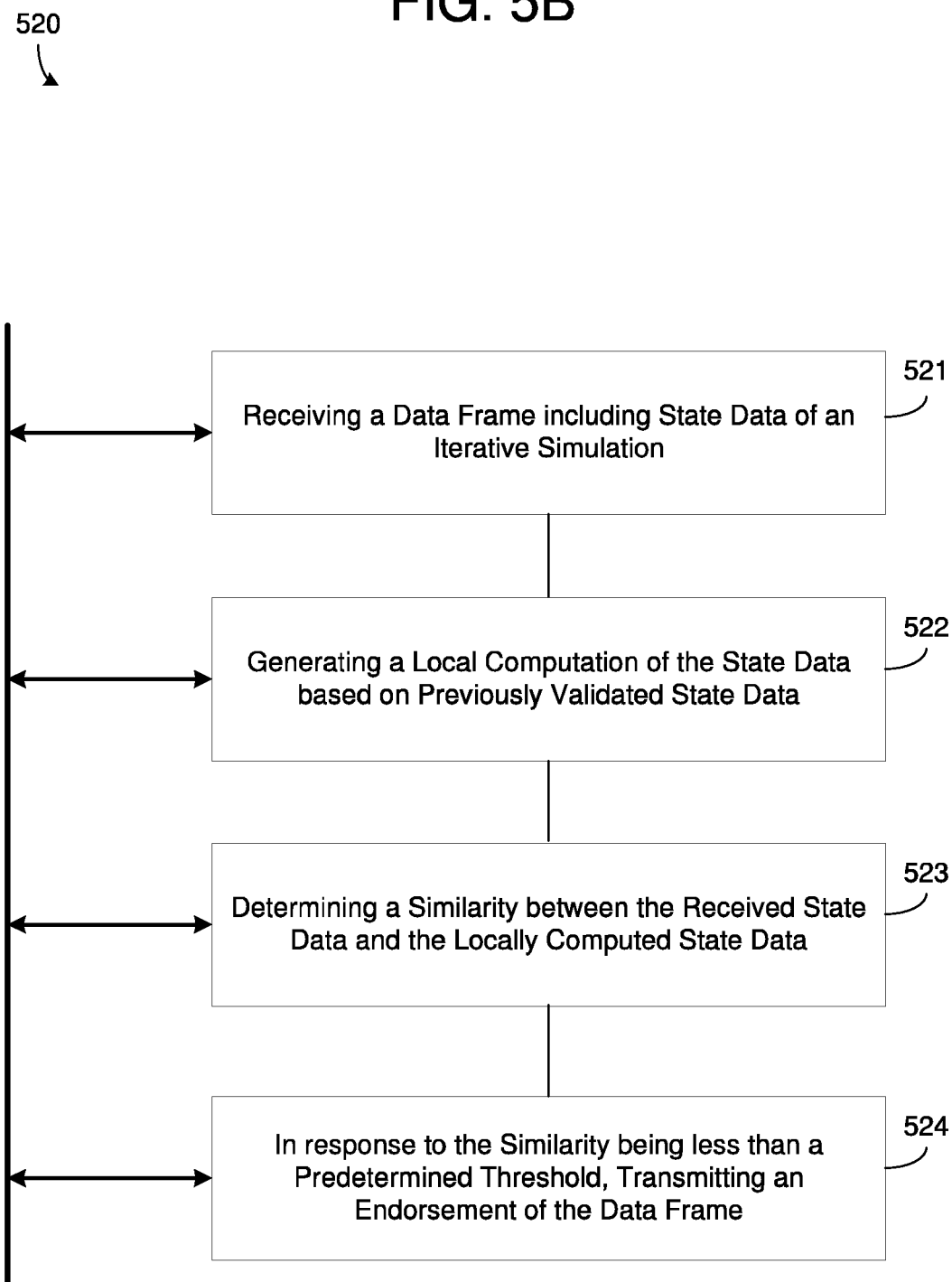
FIG. 5B is a diagram illustrating a method of endorsing a frame of simulation data, according to example embodiments.

FIG. 5B illustrates a method 520 of endorsing a frame of simulation data, according to example embodiments. For example, the method 520 may be performed by one or more endorsing nodes of a blockchain network. The node may include a computing system such as a server, a database, a cloud platform, or the like. Referring to FIG. 5B, in 521, the method may include receiving a data frame from among successive data frames of an iterative simulation. Here, the data frame may state data of the iterative simulation which includes an identification of the current state of the model (the algorithm, etc.) the training data, and the like. In some embodiments, the data frame may be compressed using a compression scheme. In some embodiments, the data frame may be decompressed to reveal the state of the simulation before the compression.

In 522, the method may include generating a local computation of state data for the data frame based on previously validated state data from a previous frame. Here, the previously validated state data may be stored in a previous frame within a block of the blockchain. In 523, the method may include determining a similarity between the local computation of state data and the state data within the received data frame. In response to a determination that the similarity is within a predetermined threshold, in 524 the method may include transmitting an endorsement of the data frame to a blockchain network for inclusion within a data block among a hash-linked chain of data blocks.

In some embodiments, the iterative simulation may include a deep learning simulation of a model being trained via a neural network, and the like. Furthermore, the successive frames store changes in state of the model over iterations. In some embodiments, the predetermined threshold may identify an acceptable level of deviation between the local computation of the state data and the state data within the received data frame. In some embodiments, the method may further include, in response to a determination that the similarity is outside the predetermined threshold, transmitting a message to a client node that submitted the data frame indicating the state data is invalid. In some embodiments, the method may further include receiving an updated data frame including a refined state data and determining a similarity between the location computation of the state data and the refined state data within the updated data frame.

Figure 5C:
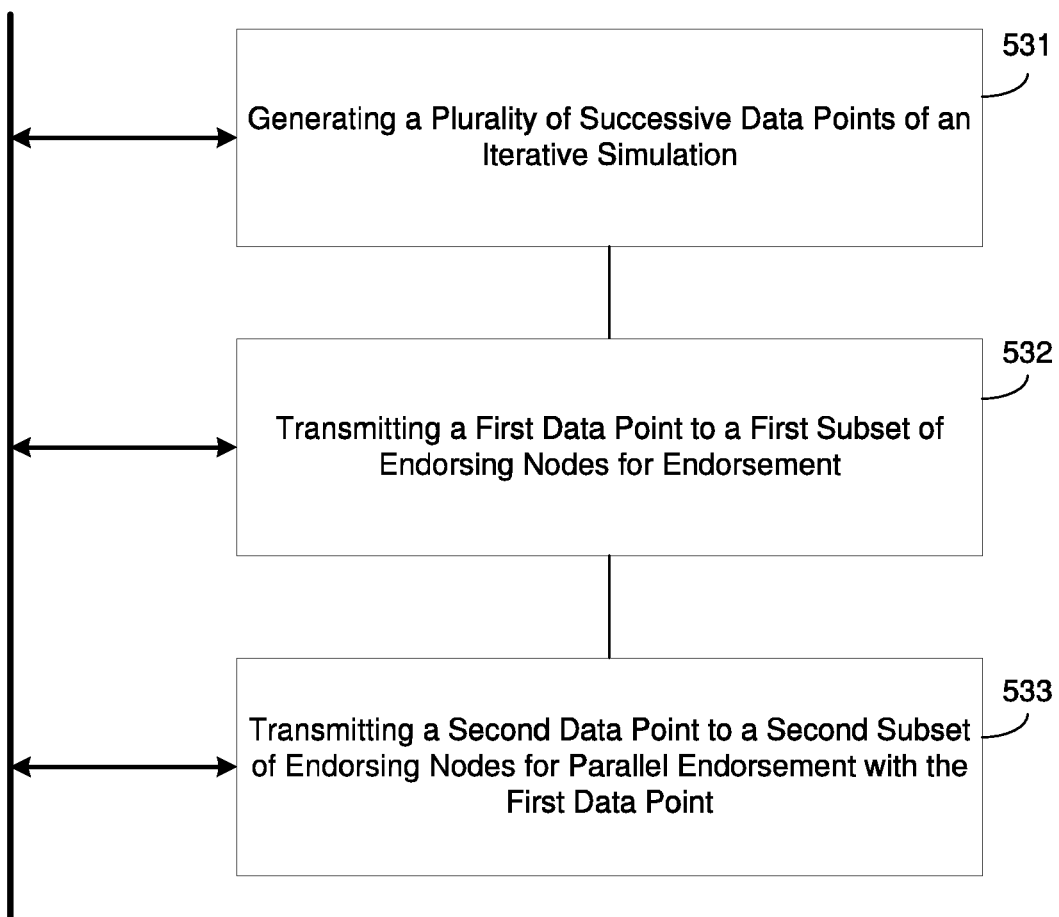
FIG. 5C is a diagram illustrating a method of assigning successive frames of simulation data for parallel endorsement, according to example embodiments.

FIG. 5C illustrates a method 530 of assigning successive frames of simulation data for parallel endorsement, according to example embodiments. For example, the method 530 may be performed by a client node of a blockchain network. The node may include a computing system such as a server, a database, a cloud platform, or the like. Referring to FIG. 5C, in 531, the method may include generating a plurality of successive data points of an iterative simulation based on predefined checkpoints. For example, each data point may include a frame or window of data that stores an identification of an evolving state of the iterative simulation with respect to a previous data point among the successive data points. Here, the simulation may be a deep learning simulation such as a machine learning algorithm being trained via a neural network or the like. The data point may be compressed to reduce computational overhead.

In 532, the method may include transmitting a blockchain request for validating state data within a first data point among the plurality of successive data points to a first subset of endorsing nodes of a blockchain network, and in 532, the method may further include transmitting a blockchain request for validating state data within a second data point among the plurality of successive data points to a second subset of endorsing nodes which are mutually exclusive from the first subset of endorsing nodes of the blockchain network for parallel endorsement of the first and second data points. The client node may reduce computation of endorsing peer nodes by using only a subset of endorsing peer nodes for endorsing a frame and using a different subset of endorsing nodes for endorsing a different frame.

In some embodiments, the state data of the first data point is generated based on a first iteration of the iterative simulation and the state data of the second data point is based on a subsequent iteration of the iterative simulation. In some embodiments, the second data point stores differences between a state of the iterative simulation of the first data point and a state of the iterative simulation at the second data point. In some embodiments, the method further include receiving a message from the second subset of endorsing nodes indicating the state data of the second data point is invalid.

In some embodiments, the method may further include refining the state data of the invalidated second data point to generate an updated state data for the second data point and transmitting the updated state data to the second subset of endorsing nodes for validation. In some embodiments, the method may further include storing an iteration ID within each data point from among the successive data points, wherein the iteration ID identifies a respective iteration of the iterative simulation associated with the respective data point. In some embodiments, the method may further include executing the iterative simulation to generate the plurality of successive data points.

FIG. 5D illustrates a method 540 of ordering simulation data as a result of parallel endorsement processing, according to example embodiments. For example, the method 540 may be performed by an ordering node of a blockchain network. The node may include a computing system such as a server, a database, a cloud platform, or the like. Referring to FIG. 5D, in 541, the method may include receiving, via a first subset of peer nodes, a verification of state data of a first data point among a plurality of successive data points generated by an iterative simulation, and in 542, receiving, via a second subset of endorsing peer nodes which are mutually exclusive from the first subset of peer nodes, a verification of state data of a second data point among the plurality of successive data points of the iterative simulation. Here, the first and second data points may be verified or otherwise endorsed, in parallel, by different subsets of endorsing peer nodes of a same blockchain network including the ordering node.

In 532, the method may include generating one or more data blocks which include the first and second data points including the validated state data, and in 533, the method may include transmitting the one or more data blocks to peer nodes within a blockchain network for storage among a hash-linked chain of data blocks. For example, the ordering node may transmit the data blocks to peer nodes in the blockchain network for storage on a local replica of the blockchain held by each peer node.

In some embodiments, the method may further include arranging the first data point and the second data point within a queue based on timestamps included in the first data point and the second data point. In this example, the generating the one or more data blocks may include ordering the first and second data points within the one or more data blocks based on a position of the first and second data points within the queue. In some embodiments, each verification may indicate that the state data of the respective data point is within an acceptable range of deviation from a predefined threshold. In some embodiments, the first and second data points may each comprise an iteration ID that identifies a respective iteration of the iterative simulation associated with the respective data point.

Figure 5E:
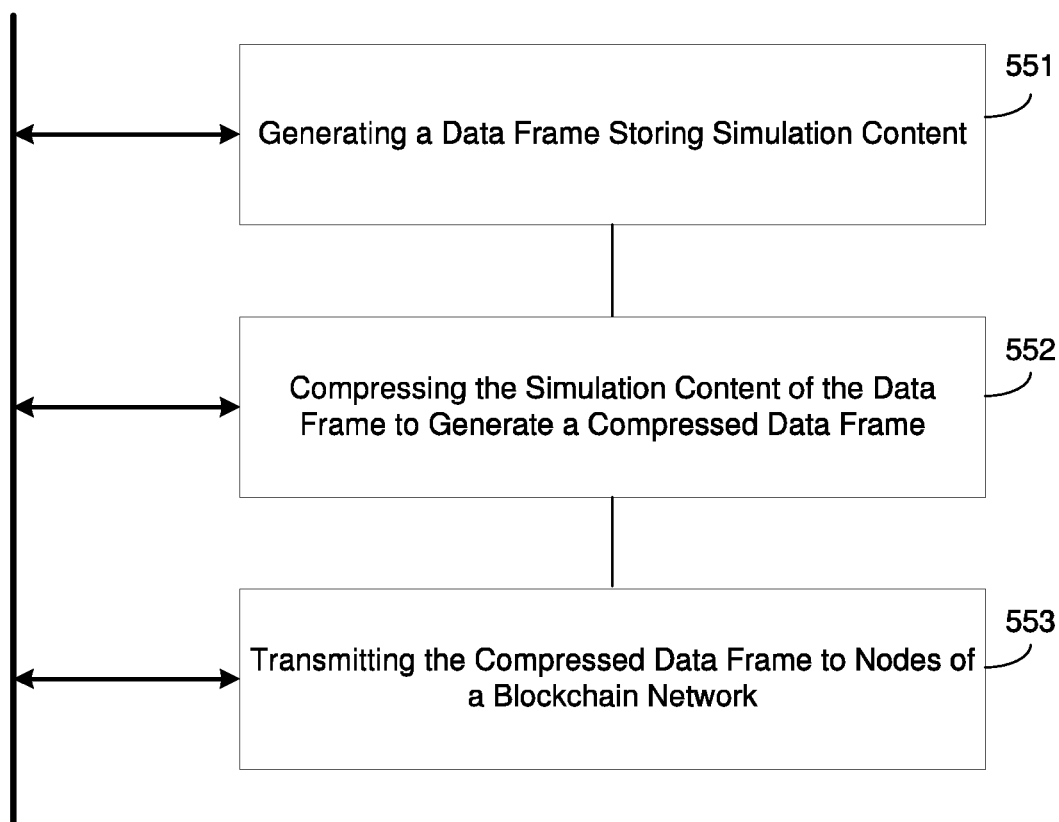
FIG. 5E is a diagram illustrating a method of compressing simulation content, according to example embodiments.

FIG. 5E illustrates a method 550 of compressing simulation content, according to example embodiments. For example, the method 550 may be performed by client node of a blockchain network which generates and/or receives computational data. The node may include a computing system such as a server, a database, a cloud platform, multiple systems, or the like. Referring to FIG. 5E, in 551 the method may include generating a data frame storing content of a simulation. Here, the data frame may be one of multiple data frames including successively generated state data of a computational model and data such as a deep learning model, a large-scale simulation, and the like.

In 552, the method may include compressing the simulation content within the data frame based on previous simulation content stored in another data frame to generate a compressed data frame. For example, the simulation content may be state data from an iterative simulation or state data from a non-iterative simulation. If the simulation is a non-iterative simulation having a plurality of input/output pairs, the compressing may include compressing the non-iterative simulation content based on a minimum spanning tree (MST) process that is based on a closeness of input/output pairs. As another example, if the simulation is an iterative simulation having a state that iteratively evolves, the compressing may include compressing the iterative simulation content based on differences in state with a previous iteration of the iterative simulation. The previous state may be identified by the node and used to insert deltas of the state data between the two frames, rather than include the entire state data.

In 553, the method may include transmitting the compressed data frame via a blockchain request to one or more endorsing peer nodes of a blockchain network for inclusion of the compressed data frame within a hash-linked chain of blocks of the blockchain network. For example, the blockchain request may include a request to endorse the transaction for storage on a blockchain. In some embodiments, the data frame may include an adaptive size based on one or more predefined checkpoints within the simulation content. In some embodiments, the compressed data frame may include a state update with respect to a previous compressed data frame of the simulation content.

Figure 5F:
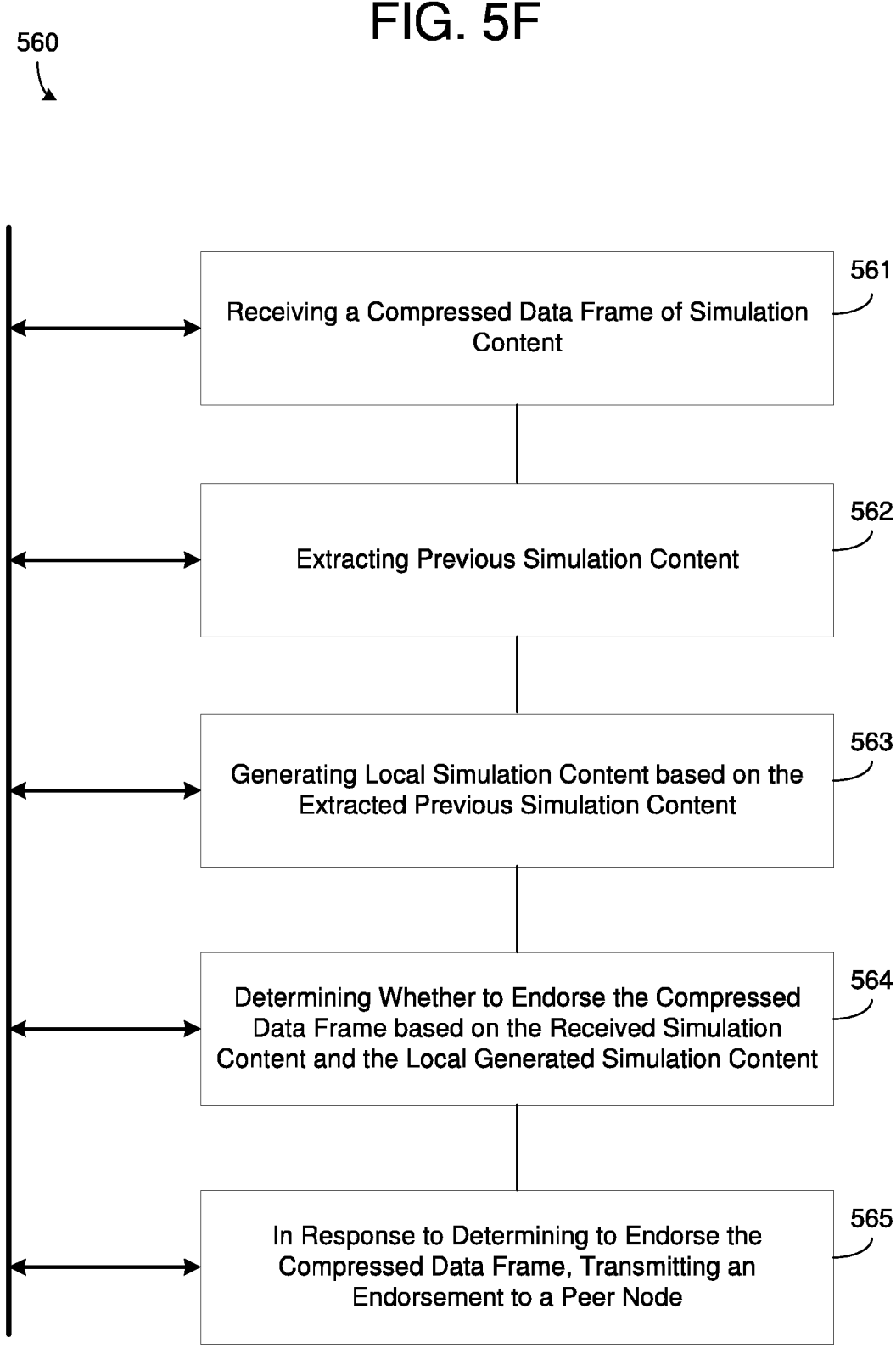
FIG. 5F is a diagram illustrating a method of endorsing simulation content, according to example embodiments.

FIG. 5F illustrates a method 560 of endorsing compressed simulation content, according to example embodiments. For example, the method 560 may be performed by an endorsing peer node or subset of endorsing peer nodes within a blockchain network. Referring to FIG. 5F, in 561, the method may include receiving a data frame that includes simulation content which has been compressed based on previous simulation content stored in a previous data frame. In some embodiments, the compressed content may be decompressed. In 562, the method may include extracting the previous simulation content stored in the previous data frame from a hash-linked chain of data blocks. The previous simulation content may be extracted from a blockchain which stores previously validated state data of the simulation in blocks.

In 563, the method may include generating local simulation content based on the extracted previous simulation content. Here, the local simulation content may be generated by recomputing the state value of the simulation using the previously validated state of the simulation stored by the node, to determine an estimate of the state. In 564, the method may include determining whether to endorse the received data frame for inclusion in the hash-linked chain of blocks based on a difference between the received compressed simulation content and the local simulation content. The determining may be based on a similarity between the received state data of the simulation content and state data the locally generated simulation content. If the state data is within a predefined threshold deviation, the endorsement may be authorized. In 565, in response to a determination to endorse the received data frame, the method may include transmitting an endorsement to a peer node in a blockchain network.

In some embodiments, the received compressed simulation content may be stored in the data frame and may include content from a non-iterative simulation having a plurality of input/output pairs. In this example, the non-iterative simulation content may be compressed based on an MST process that is based on a closeness of input/output pairs. In some embodiments, the received compressed simulation content may be stored in the data frame and may include content from an iterative simulation having a state that iteratively evolves. In some embodiments, the iterative simulation content may be compressed based on differences in state with a previous iteration of the iterative simulation.

Figure 6A:
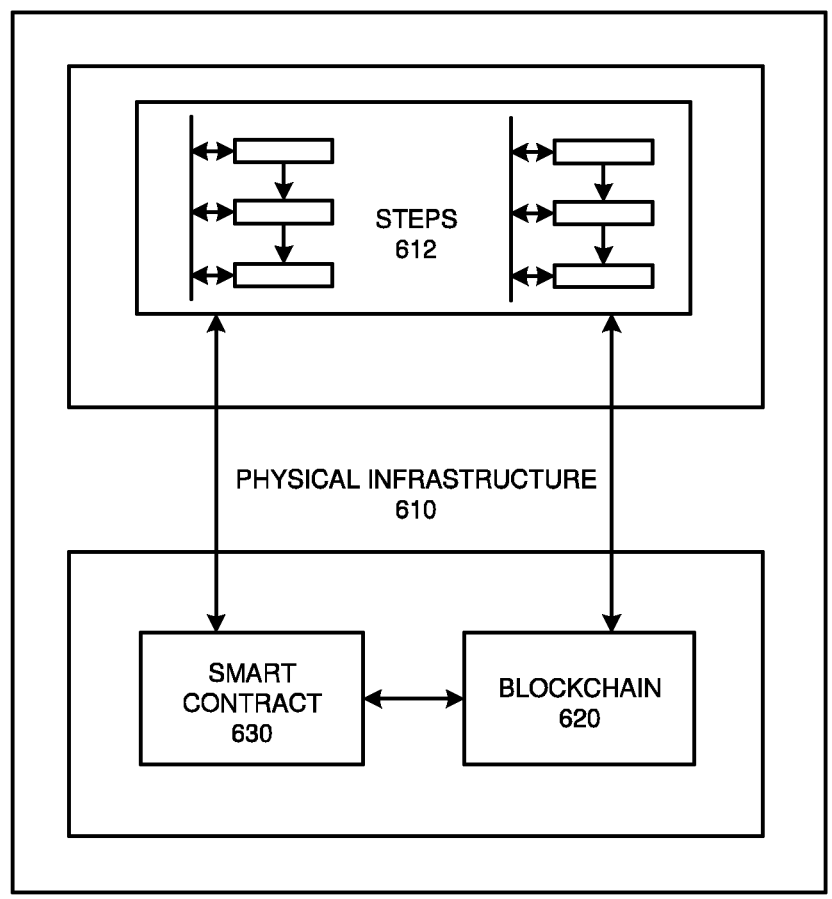
FIG. 6A is a diagram illustrating a physical infrastructure configured to perform various operations on the blockchain in accordance with one or more operations described herein, according to example embodiments.

FIG. 6A illustrates an example physical infrastructure configured to perform various operations on the blockchain in accordance with one or more of the example methods of operation according to example embodiments. Referring to FIG. 6A, the example configuration 600A includes a physical infrastructure 610 with a blockchain 620 and a smart contract 640, which may execute any of the operational steps 612 included in any of the example embodiments. The steps/operations 612 may include one or more of the steps described or depicted in one or more flow diagrams and/or logic diagrams. The steps may represent output or written information that is written or read from one or more smart contracts 640 and/or blockchains 620 that reside on the physical infrastructure 610 of a computer system configuration. The data can be output from an executed smart contract 640 and/or blockchain 620. The physical infrastructure 610 may include one or more computers, servers, processors, memories, and/or wireless communication devices.

Figure 6B:
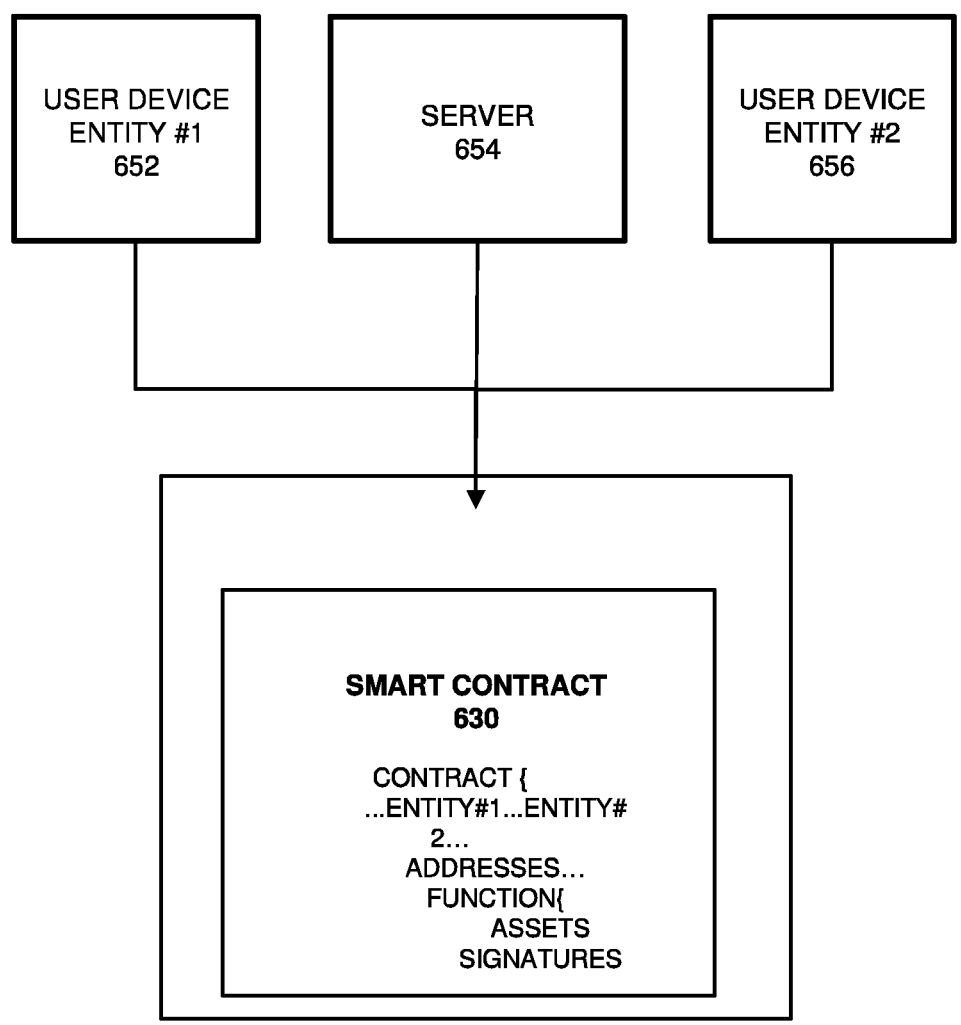
FIG. 6B is a diagram illustrating a smart contract configuration among contracting parties and a mediating server configured to enforce smart contract terms on a blockchain, according to example embodiments.

FIG. 6B illustrates an example smart contract configuration among contracting parties and a mediating server configured to enforce the smart contract terms on the blockchain according to example embodiments. Referring to FIG. 6B, the configuration 650B may represent a communication session, an asset transfer session or a process or procedure that is driven by a smart contract 630 which explicitly identifies one or more user devices 652 and/or 656. The execution, operations and results of the smart contract execution may be managed by a server 654. Content of the smart contract 640 may require digital signatures by one or more of the entities 652 and 656 which are parties to the smart contract transaction.

Figure 6C:
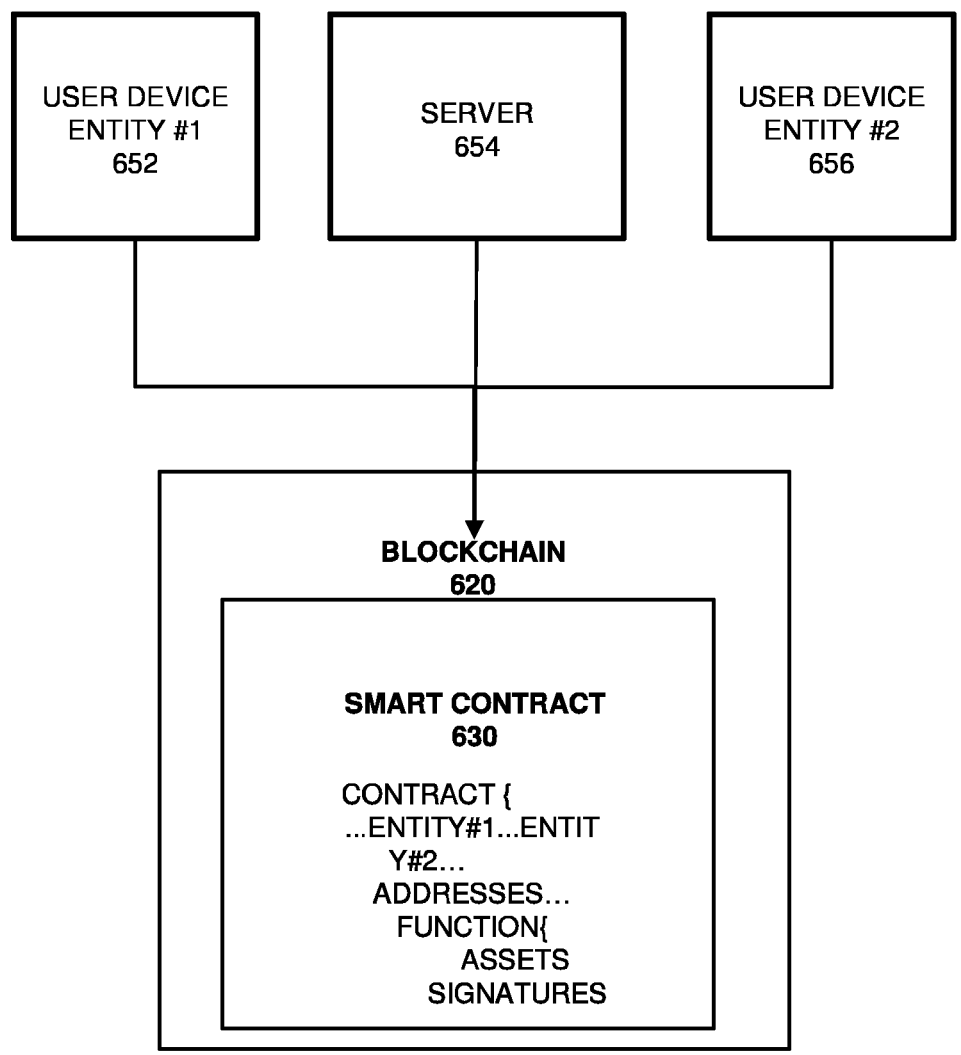
FIG. 6C is a diagram illustrating a smart contract configuration among contracting parties and a mediating server configured to enforce the smart contract terms on the blockchain according to example embodiments.

FIG. 6C illustrates an example smart contract configuration among contracting parties and a mediating server configured to enforce the smart contract terms on the blockchain according to example embodiments. Referring to FIG. 6C, the configuration 650 may represent a communication session, an asset transfer session or a process or procedure that is driven by a smart contract 630 which explicitly identifies one or more user devices 652 and/or 656. The execution, operations and results of the smart contract execution may be managed by a server 654. Content of the smart contract 630 may require digital signatures by one or more of the entities 652 and 656 which are parties to the smart contract transaction. The results of the smart contract execution may be written to a blockchain 620 as a blockchain transaction. In this example, the smart contract 630 resides on the blockchain 620 which may reside on one or more computers, servers, processors, memories, and/or wireless communication devices.

Figure 6D:
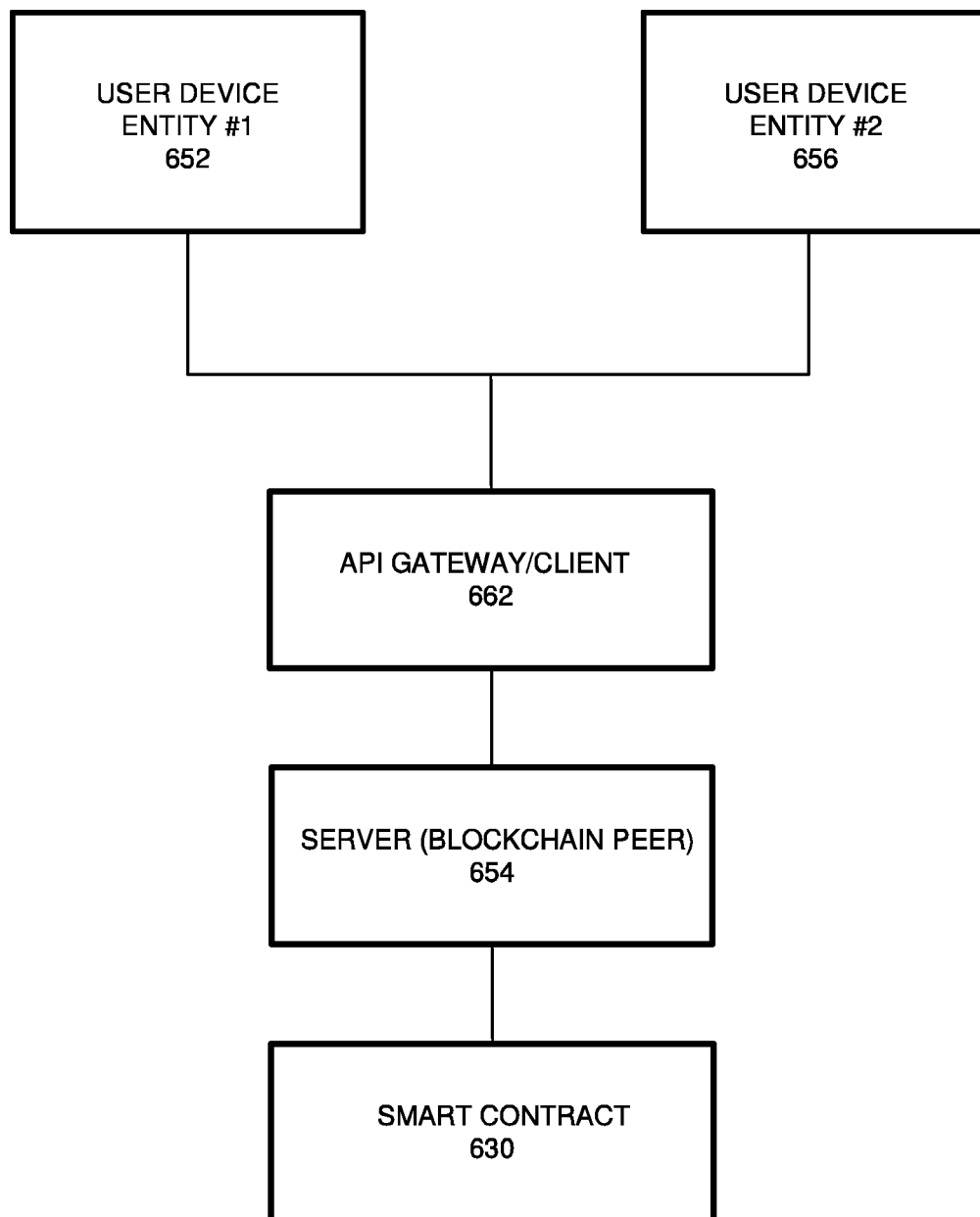
FIG. 6D is a diagram illustrating another example blockchain-based smart contact system, according to example embodiments.

FIG. 6D illustrates a common interface for accessing logic and data of a blockchain, according to example embodiments. Referring to the example of FIG. 6D, an application programming interface (API) gateway 662 provides a common interface for accessing blockchain logic (e.g., smart contract 630 or other chaincode) and data (e.g., distributed ledger, etc.) In this example, the API gateway 662 is a common interface for performing transactions (invoke, queries, etc.) on the blockchain by connecting one or more entities 652 and 656 to a blockchain peer (i.e., server 654). The server 654 is a blockchain network peer component that holds a copy of the world state and a distributed ledger allowing clients 652 and 656 to query data on the world state as well as submit transactions into the blockchain network where, depending on the smart contract 630 and endorsement policy, endorsing peers will run the smart contracts 630.

Figure 7B:
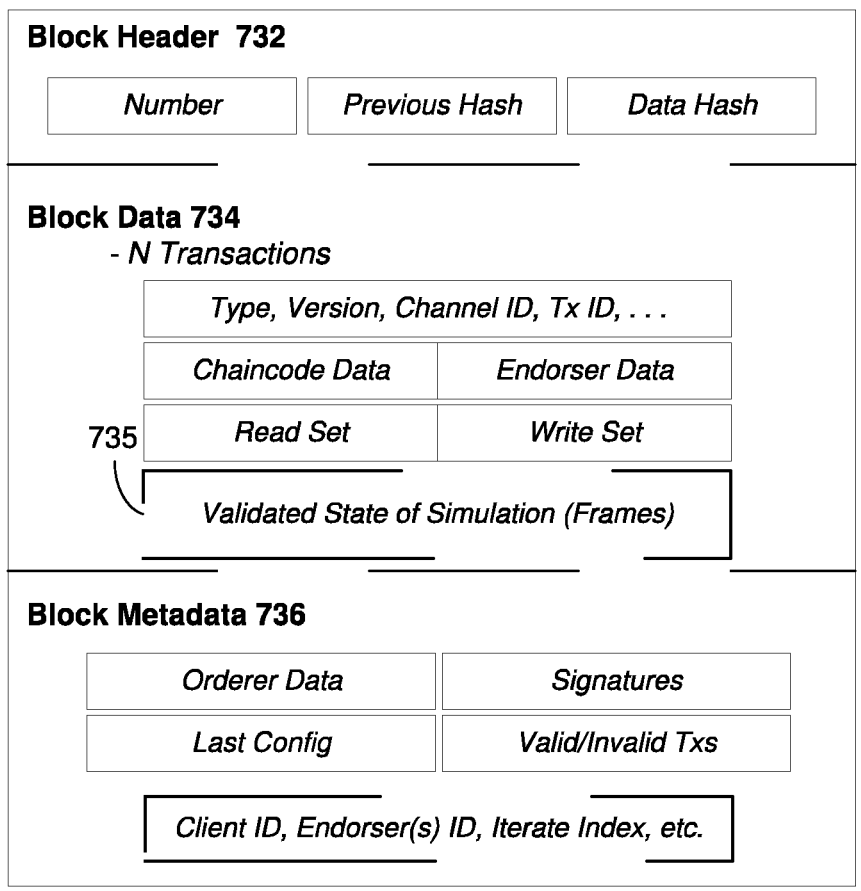
FIG. 7B is a diagram illustrating contents of a data block structure for blockchain, according to example embodiments.

FIG. 7A illustrates a process 700 of a new block 730 being added to a distributed ledger 720, according to example embodiments, and FIG. 7B illustrates contents of a block structure 730 for blockchain, according to example embodiments. Referring to FIG. 7A, clients (not shown) may submit transactions to blockchain nodes 711, 712, and/or 713. Clients may be instructions received from any source to enact activity on the blockchain. As an example, clients may be applications (based on a SDK) that act on behalf of a requester, such as a device, person or entity to propose transactions for the blockchain. The plurality of blockchain peers (e.g., blockchain nodes 711, 712, and 713) may maintain a state of the blockchain network and a copy of the distributed ledger 720.

Different types of blockchain nodes/peers may be present in the blockchain network including endorsing peers which simulate and endorse transactions proposed by clients and committing peers which verify endorsements, validate transactions, and commit transactions to the distributed ledger 720. In this example, the blockchain nodes 711, 712, and 713 may perform the role of endorser node, committer node, or both.

The distributed ledger 720 includes a blockchain 722 which stores immutable, sequenced records in blocks, and a state database 724 (current world state) maintaining a current state (key values) of the blockchain 722. One distributed ledger 720 may exist per channel and each peer maintains its own copy of the distributed ledger 720 for each channel of which they are a member. The blockchain 722 is a transaction log, structured as hash-linked blocks where each block contains a sequence of N transactions. Blocks (e.g., block 730) may include various components such as shown in FIG. 7B. The linking of the blocks (shown by arrows in FIG. 7A) may be generated by adding a hash of a prior block's header within a block header of a current block. In this way, all transactions on the blockchain 722 are sequenced and cryptographically linked together preventing tampering with blockchain data without breaking the hash links. Furthermore, because of the links, the latest block in the blockchain 722 represents every transaction that has come before it. The blockchain 722 may be stored on a peer file system (local or attached storage), which supports an append-only blockchain workload.

The current state of the blockchain 722 and the distributed ledger 720 may be stored in the state database 724. Here, the current state data represents the latest values for all keys ever included in the chain transaction log of the blockchain 722. Chaincode invocations execute transactions against the current state in the state database 724. To make these chaincode interactions efficient, the latest values of all keys may be stored in the state database 724. The state database 724 may include an indexed view into the transaction log of the blockchain 722 and can therefore be regenerated from the chain at any time. The state database 724 may automatically get recovered (or generated if needed) upon peer startup, before transactions are accepted.

Endorsing nodes receive transactions from clients and endorse the transaction (e.g., changes in simulation state, etc.) based on simulated results. Endorsing nodes may hold smart contracts which simulate the transaction proposals. The nodes needed to endorse a transaction depends on an endorsement policy which may be specified within chaincode. An example of an endorsement policy is "the majority of endorsing peers must endorse the transaction." Different channels may have different endorsement policies. Endorsed transactions are forward by the client application to an ordering service 710.

The ordering service 710 accepts endorsed transactions, orders them into a block, and delivers the blocks to the committing peers. For example, the ordering service 710 may initiate a new block when a threshold of transactions has been reached, a timer times out, or another condition. The ordering service 710 may operate based on the timestamp agreement processes described herein such as calculating a final timestamp for each transaction based on a weighted average of timestamps from blockchain nodes 711-713, etc. In the example of FIG. 7A, blockchain node 712 is a committing peer that has received a new data block 730 for storage on blockchain 722.

The ordering service 710 may be made up of a cluster of orderers. The ordering service 710 does not process transactions, smart contracts, or maintain the shared ledger. Rather, the ordering service 710 may accept the endorsed transactions, determine a final timestamp for transactions, and specifies the order in which those transactions are committed to the distributed ledger 720 based on the final timestamps. The architecture of the blockchain network may be designed such that the specific implementation of 'ordering' (e.g., Solo, Kafka, BFT, etc.) becomes a pluggable component.

Transactions are written to the distributed ledger 720 in a consistent order. The order of transactions is established to ensure that the updates to the state database 724 are valid when they are committed to the network. Unlike a cryptocurrency blockchain system (e.g., Bitcoin, etc.) where ordering occurs through the solving of a cryptographic puzzle, or mining, in this example the parties of the distributed ledger 720 may choose the ordering mechanism that best suits that network such as chronological ordering.

When the ordering service 710 initializes a new block 730, the new block 730 may be broadcast to committing peers (e.g., blockchain nodes 711, 712, and 713). In response, each committing peer validates the transaction within the new block 730 by checking to make sure that the read set and the write set still match the current world state in the state database 724. Specifically, the committing peer can determine whether the read data that existed when the endorsers simulated the transaction is identical to the current world state in the state database 724. When the committing peer validates the transaction, the transaction is written to the blockchain 722 on the distributed ledger 720, and the state database 724 is updated with the write data from the read-write set. If a transaction fails, that is, if the committing peer finds that the read-write set does not match the current world state in the state database 724, the transaction ordered into a block will still be included in that block, but it will be marked as invalid, and the state database 724 will not be updated.

Referring to FIG. 7B, a block 730 (also referred to as a data block) that is stored on the blockchain 722 of the distributed ledger 720 may include multiple data segments such as a block header 732, block data 734, and block metadata 736. It should be appreciated that the various depicted blocks and their contents, such as block 730 and its contents shown in FIG. 7B are merely for purposes of example and are not meant to limit the scope of the example embodiments. In some cases, both the block header 732 and the block metadata 736 may be smaller than the block data 734 which stores transaction data, however this is not a requirement. The block 730 may store transactional information of N transactions (e.g., 100, 500, 1000, 2000, 3000, etc.) within the block data 734. According to various embodiments, each transaction may include frame data 735 which includes changes in state of a simulation (e.g., iterative, non-iterative, etc.) which have been validated by endorsing peer nodes.

The metadata 736 may include an identification of a client node/worker that generated the data frame, the endorsing nodes that endorse the frame, an iteration(s) of the simulation where the state data is taken from (e.g., iterate index, etc.), an environment ID pointing to an instance of simulation that was run to generate the frame, and the like. The metadata may be stored in the block metadata section 736 in addition to valid/invalid indicator for every transaction. The metadata stored is useful to revalidate the indicator of the information stored in the data block.

Traditional blockchains store information such as transactions (transfer of property), and smart contracts (instruction sets to be executed). In the present embodiments, the data being stored may also include the validated states of the computational process. That is, each block may include a frame that includes the compressed checkpoint and quantized state updates obtained from delta encoding of successive iterates in a frame. Additional metadata to be stored might include the ID of the client performing the simulation, the endorsers who validated the states, the iterate index, and other extraneous information used for performing the simulation.

The block 730 may also include a link to a previous block (e.g., on the blockchain 722 in FIG. 7A) within the block header 732. In particular, the block header 732 may include a hash of a previous block's header. The block header 732 may also include a unique block number, a hash of the block data 734 of the current block 730, and the like. The block number of the block 730 may be unique and assigned in an incremental/sequential order starting from zero. The first block in the blockchain may be referred to as a genesis block which includes information about the blockchain, its members, the data stored therein, etc.

The block data 734 may store transactional information of each transaction that is recorded within the block 730. For example, the transaction data stored within block data 734 may include one or more of a type of the transaction, a version, a timestamp (e.g., final calculated timestamp, etc.), a channel ID of the distributed ledger 720, a transaction ID, an epoch, a payload visibility, a chaincode path (deploy tx), a chaincode name, a chaincode version, input (chaincode and functions), a client (creator) identify such as a public key and certificate, a signature of the client, identities of endorsers, endorser signatures, a proposal hash, chaincode events, response status, namespace, a read set (list of key and version read by the transaction, etc.), a write set (list of key and value, etc.), a start key, an end key, a list of keys, a Merkel tree query summary, and the like. The transaction data may be stored for each of the N transactions.

The block metadata 736 may store multiple fields of metadata (e.g., as a byte array, etc.). Metadata fields may include signature on block creation, a reference to a last configuration block, a transaction filter identifying valid and invalid transactions within the block, last offset persisted of an ordering service that ordered the block, and the like. The signature, the last configuration block, and the orderer metadata may be added by the ordering service 710. Meanwhile, a committing node of the block (such as blockchain node 712) may add validity/invalidity information based on an endorsement policy, verification of read/write sets, and the like. The transaction filter may include a byte array of a size equal to the number of transactions in the block data 734 and a validation code identifying whether a transaction was valid/invalid.

The above embodiments may be implemented in hardware, in a computer program executed by a processor, in firmware, or in a combination of the above. A computer program may be embodied on a computer readable medium, such as a storage medium. For example, a computer program may reside in random access memory ("RAM"), flash memory, read-only memory ("ROM"), erasable programmable read-only memory ("EPROM"), electrically erasable programmable read-only memory ("EEPROM"), registers, hard disk, a removable disk, a compact disk read-only memory ("CD-ROM"), or any other form of storage medium known in the art.

An exemplary storage medium may be coupled to the processor such that the processor may read information from, and write information to, the storage medium. In the alternative, the storage medium may be integral to the processor. The processor and the storage medium may reside in an application specific integrated circuit ("ASIC"). In the alternative, the processor and the storage medium may reside as discrete components. For example, FIG. 8 illustrates an example computer system architecture 800, which may represent or be integrated in any of the above-described components, etc.

Figure 8:
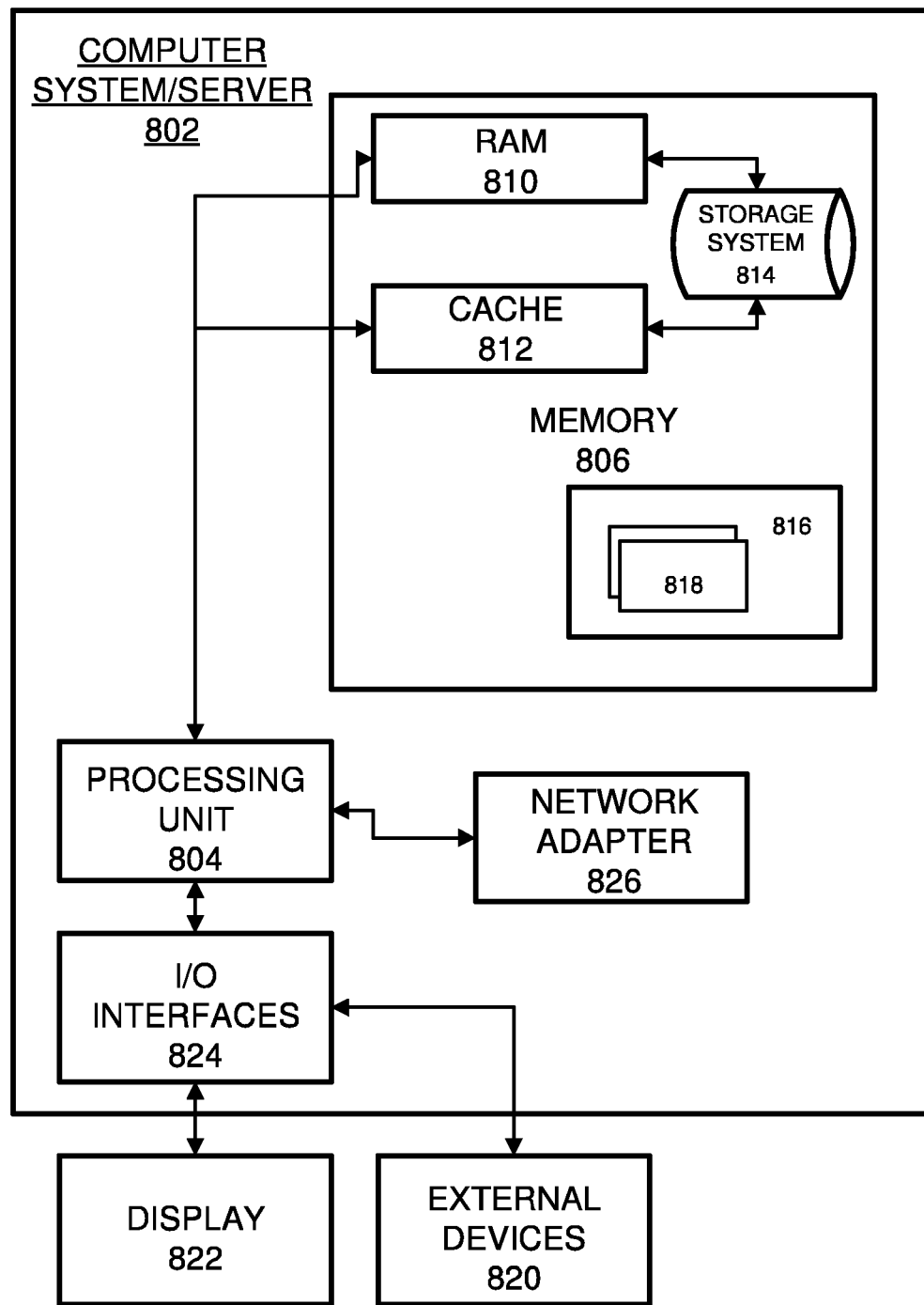
FIG. 8 is a diagram illustrating an example computer system configured to support one or more of the example embodiments.

FIG. 8 is not intended to suggest any limitation as to the scope of use or functionality of embodiments of the application described herein. Regardless, the computing node 800 is capable of being implemented and/or performing any of the functionality set forth hereinabove. For example, the computing node 800 may perform any of the methods 510-560 shown and described with respect to FIGS. 5A-5F.

In computing node 800 there is a computer system/server 802, which is operational with numerous other general purpose or special purpose computing system environments or configurations. Examples of well-known computing systems, environments, and/or configurations that may be suitable for use with computer system/server 802 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 802 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 802 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 8, computer system/server 802 in cloud computing node 800 is shown in the form of a general-purpose computing device. The components of computer system/server 802 may include, but are not limited to, one or more processors or processing units 804, a system memory 806, and a bus that couples various system components including system memory 806 to processor 804.

The bus represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 802 typically includes a variety of computer system readable media. Such media may be any available media that is accessible by computer system/server 802, and it includes both volatile and non-volatile media, removable and non-removable media. System memory 806, in one embodiment, implements the flow diagrams of the other figures. The system memory 806 can include computer system readable media in the form of volatile memory, such as random-access memory (RAM) 810 and/or cache memory 812. Computer system/server 802 may further include other removable/non-removable, volatile/non-volatile computer system storage media. By way of example only, storage system 814 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to the bus by one or more data media interfaces. As will be further depicted and described below, memory 806 may include at least one program product having a set (e.g., at least one) of program modules that are configured to carry out the functions of various embodiments of the application.

Program/utility 816, having a set (at least one) of program modules 818, may be stored in memory 806 by way of example, and not limitation, as well as an operating system, one or more application programs, other program modules, and program data. Each of the operating system, one or more application programs, other program modules, and program data or some combination thereof, may include an implementation of a networking environment. Program modules 818 generally carry out the functions and/or methodologies of various embodiments of the application as described herein.

As will be appreciated by one skilled in the art, aspects of the present application may be embodied as a system, method, or computer program product. Accordingly, aspects of the present application may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present application may take the form of a computer program product embodied in one or more computer readable medium(s) having computer readable program code embodied thereon.

Computer system/server 802 may also communicate with one or more external devices 820 such as a keyboard, a pointing device, a display 822, etc.; one or more devices that enable a user to interact with computer system/server 802; and/or any devices (e.g., network card, modem, etc.) that enable computer system/server 802 to communicate with one or more other computing devices. Such communication can occur via I/O interfaces 824. Still yet, computer system/server 802 can communicate with one or more networks such as a local area network (LAN), a general wide area network (WAN), and/or a public network (e.g., the Internet) via network adapter 826. As depicted, network adapter 826 communicates with the other components of computer system/server 802 via a bus. It should be understood that although not shown, other hardware and/or software components could be used in conjunction with computer system/server 802. Examples, include, but are not limited to: microcode, device drivers, redundant processing units, external disk drive arrays, RAID systems, tape drives, and data archival storage systems, etc.

Although an exemplary embodiment of at least one of a system, method, and non-transitory computer readable medium has been illustrated in the accompanied drawings and described in the foregoing detailed description, it will be understood that the application is not limited to the embodiments disclosed, but is capable of numerous rearrangements, modifications, and substitutions as set forth and defined by the following claims. For example, the capabilities of the system of the various figures can be performed by one or more of the modules or components described herein or in a distributed architecture and may include a transmitter, receiver or pair of both. For example, all or part of the functionality performed by the individual modules, may be performed by one or more of these modules. Further, the functionality described herein may be performed at various times and in relation to various events, internal or external to the modules or components. Also, the information sent between various modules can be sent between the modules via at least one of: a data network, the Internet, a voice network, an Internet Protocol network, a wireless device, a wired device and/or via plurality of protocols. Also, the messages sent or received by any of the modules may be sent or received directly and/or via one or more of the other modules.

One skilled in the art will appreciate that a "system" could be embodied as a personal computer, a server, a console, a personal digital assistant (PDA), a cell phone, a tablet computing device, a smartphone or any other suitable computing device, or combination of devices. Presenting the above-described functions as being performed by a "system" is not intended to limit the scope of the present application in any way but is intended to provide one example of many embodiments. Indeed, methods, systems and apparatuses disclosed herein may be implemented in localized and distributed forms consistent with computing technology.

It should be noted that some of the system features described in this specification have been presented as modules, in order to more particularly emphasize their implementation independence. For example, a module may be implemented as a hardware circuit comprising custom very large-scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, graphics processing units, or the like.

A module may also be at least partially implemented in software for execution by various types of processors. An identified unit of executable code may, for instance, comprise one or more physical or logical blocks of computer instructions that may, for instance, be organized as an object, procedure, or function. Nevertheless, the executables of an identified module need not be physically located together but may comprise disparate instructions stored in different locations which, when joined logically together, comprise the module and achieve the stated purpose for the module. Further, modules may be stored on a computer-readable medium, which may be, for instance, a hard disk drive, flash device, random access memory (RAM), tape, or any other such medium used to store data.

Indeed, a module of executable code could be a single instruction, or many instructions, and may even be distributed over several different code segments, among different programs, and across several memory devices. Similarly, operational data may be identified and illustrated herein within modules and may be embodied in any suitable form and organized within any suitable type of data structure. The operational data may be collected as a single data set or may be distributed over different locations including over different storage devices, and may exist, at least partially, merely as electronic signals on a system or network.

It will be readily understood that the components of the application, as generally described and illustrated in the figures herein, may be arranged and designed in a wide variety of different configurations. Thus, the detailed description of the embodiments is not intended to limit the scope of the application as claimed but is merely representative of selected embodiments of the application.

One having ordinary skill in the art will readily understand that the above may be practiced with steps in a different order, and/or with hardware elements in configurations that are different than those which are disclosed. Therefore, although the application has been described based upon these preferred embodiments, it would be apparent to those of skill in the art that certain modifications, variations, and alternative constructions would be apparent.

While preferred embodiments of the present application have been described, it is to be understood that the embodiments described are illustrative only and the scope of the application is to be defined solely by the appended claims when considered with a full range of equivalents and modifications (e.g., protocols, hardware devices, software platforms etc.) thereto.

What is claimed is:

1. A computing system comprising:
a network interface configured to receive a data structure from among sequential data structures of an iterative simulation that store state data of the iterative simulation; and
a processor configured to generate a local computation of state data for the data structure based on previously validated state data from a previous data structure, and determine a similarity between the local computation of state data and the state data within the received data structure,
wherein, in response to a determination that the similarity is within a predetermined threshold, the processor is further configured to control the network interface to transmit an endorsement of the data structure to a blockchain network for inclusion within a data block among a hash-linked chain of data blocks;
wherein a similarity is determined between a location computation of the state data and a refined state data within the updated data structure.

2. The computing system of claim 1, wherein the iterative simulation comprises a deep learning simulation of a model.

3. The computing system of claim 2, wherein the sequential data structures store changes in state of the model over iterations.

4. The computing system of claim 1, wherein the predetermined threshold identifies an acceptable level of deviation between the local computation of the state data and the state data within the received data structure.

5. The computing system of claim 1, wherein, in response to a determination that the similarity is outside the predetermined threshold, the processor is further configured to control the network interface to transmit a message to a client node that submitted the data structure which indicates the state data is invalid.

6. The computing system of claim 1, wherein the network interface is further configured to receive an updated data structure that includes the refined state data.

7. A method comprising:
receiving a data structure from among sequential data structures of an iterative simulation, the data structure storing state data of the iterative simulation;
generating a local computation of state data for the data structure based on previously validated state data from a previous data structure;
determining a similarity between the local computation of state data and the state data within the received data structure; and
in response to a determination that the similarity is within a predetermined threshold, transmitting an endorsement of the data structure to a blockchain network for inclusion within a data block among a hash-linked chain of data blocks;
wherein a similarity is determined between a location computation of the state data and a refined state data within the updated data structure.

8. The method of claim 7, wherein the iterative simulation comprises a deep learning simulation of a model being trained.

9. The method of claim 8, wherein the sequential data structures store changes in state of the model over iterations.

10. The method of claim 7, wherein the predetermined threshold identifies an acceptable level of deviation between the local computation of the state data and the state data within the received data structure.

11. The method of claim 7, further comprising, in response to a determination that the similarity is outside the predetermined threshold, transmitting a message to a client node that submitted the data structure indicating the state data is invalid.

12. The method of claim 7, further comprising receiving an updated data structure including the refined state data.

13. A non-transitory computer readable medium comprising instructions; that when read by a processor, cause the processor to perform a method comprising:
receiving a data structure from among sequential data structures of an iterative simulation, the data structure storing state data of the iterative simulation;
generating a local computation of state data for the data structure based on previously validated state data from a previous data structure;
determining a similarity between the local computation of state data and the state data within the received data structure; and
in response to a determination that the similarity is within a predetermined threshold, transmitting an endorsement of the data structure to a blockchain network for inclusion within a data block among a hash-linked chain of data blocks;
wherein a similarity is determined between a location computation of the state data and a refined state data within the updated data structure.

14. The non-transitory computer readable medium of claim 13, wherein the iterative simulation comprises a deep learning simulation of a model being trained.

15. The non-transitory computer readable medium of claim 13, wherein the sequential data structures store changes in state of the model over iterations.

16. The non-transitory computer readable medium of claim 13, wherein the predetermined threshold identifies an acceptable level of deviation between the local computation of the state data and the state data within the received data structure.

17. The non-transitory computer readable medium of claim 13, further comprising, in response to a determination that the similarity is outside the predetermined threshold, transmitting a message to a client node that submitted the data structure indicating the state data is invalid.

* * * * *